(12) United States Patent
Gass et al.

(10) Patent No.: US 7,784,507 B2
(45) Date of Patent: Aug. 31, 2010

(54) ROUTER WITH IMPROVED SAFETY SYSTEM

(75) Inventors: Stephen F. Gass, Wilsonville, OR (US); J. David Fulmer, Tualatin, OR (US)

(73) Assignee: SD3, LLC, Tualatin, OR (US)

( * ) Notice: Subject to any disclaimer, the term of this patent is extended or adjusted under 35 U.S.C. 154(b) by 1325 days.

(21) Appl. No.: 11/208,214

(22) Filed: Aug. 19, 2005

(65) Prior Publication Data

US 2005/0274432 A1 Dec. 15, 2005

Related U.S. Application Data

(63) Continuation of application No. 10/251,576, filed on Sep. 20, 2002, now abandoned, which is a continuation-in-part of application No. 10/197,975, filed on Jul. 18, 2002, now abandoned, application No. 11/208, 214, which is a continuation-in-part of application No. 09/676,190, filed on Sep. 29, 2000, now Pat. No. 7,055,417.

(60) Provisional application No. 60/323,975, filed on Sep. 21, 2001.

(51) Int. Cl.
*B23Q 15/00* (2006.01)
*B26D 5/24* (2006.01)
(52) U.S. Cl. .................. 144/382; 144/136.95; 83/62.1
(58) Field of Classification Search ............ 144/136.95, 144/154.5, 371, 382, 402, 404, 394, 1.1, 144/136.1, 401; 409/188; 318/431, 432, 318/433, 434; 83/62, 62.1, 63, 64, 66, 76.3, 83/522.12, 590; 192/130, 132, 138–140, 192/144, 148, 150
See application file for complete search history.

(56) References Cited

U.S. PATENT DOCUMENTS

| 146,886 A | 1/1874 | Doane et al. |
|---|---|---|
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 997,720 A | 7/1911 | Troupenat |
| 1,037,843 A | 9/1912 | Ackley |
| 1,050,649 A | 1/1913 | Harrold et al. |

(Continued)

FOREIGN PATENT DOCUMENTS

CH 297525 6/1954

(Continued)

OTHER PUBLICATIONS

Skil Model 3400-Type 1 10" Table Saw Parts List and Technical Bulletin, S-B Power Tool Company, Jun. 1993.

(Continued)

*Primary Examiner*—Shelley Self

(57) ABSTRACT

A router is described for cutting workpieces with router bits. The router includes a safety system configured to detect one or more dangerous conditions between a person and a router bit. The safety system includes a reaction subsystem configured to perform one or more predetermined actions in the event a dangerous condition is detected. In one embodiment, the safety system is configured to detect accidental contact between a person and the router bit, and then at least partially retract the router bit the person.

10 Claims, 13 Drawing Sheets

U.S. PATENT DOCUMENTS

| | | | |
|---|---|---|---|
| 1,054,558 A | 2/1913 | Jones | |
| 1,074,198 A | 9/1913 | Phillips | |
| 1,082,870 A | 12/1913 | Humason | |
| 1,101,515 A | 6/1914 | Adam | |
| 1,126,970 A | 2/1915 | Folmer | |
| 1,132,129 A | 3/1915 | Stevens | |
| 1,148,169 A | 7/1915 | Howe | |
| 1,154,209 A | 9/1915 | Rushton | |
| 1,205,246 A | 11/1916 | Mowry | |
| 1,228,047 A | 5/1917 | Reinhold | |
| 1,240,430 A | 9/1917 | Erickson | |
| 1,244,187 A | 10/1917 | Frisbie | |
| 1,255,886 A | 2/1918 | Jones | |
| 1,258,961 A | 3/1918 | Tattersall | |
| 1,311,508 A | 7/1919 | Harrold | |
| 1,324,136 A | 12/1919 | Turner | |
| 1,381,612 A | 6/1921 | Anderson | |
| 1,397,606 A | 11/1921 | Smith | |
| 1,427,005 A | 8/1922 | McMichael | |
| 1,430,983 A | 10/1922 | Granberg | |
| 1,450,906 A | 4/1923 | Anderson | |
| 1,464,924 A | 8/1923 | Drummond | |
| 1,465,224 A | 8/1923 | Lantz | |
| 1,496,212 A | 6/1924 | French | |
| 1,511,797 A | 10/1924 | Berghold | |
| 1,526,128 A | 2/1925 | Flohr | |
| 1,527,587 A | 2/1925 | Hutchinson | |
| 1,551,900 A | 9/1925 | Morrow | |
| 1,553,996 A | 9/1925 | Federer | |
| 1,582,483 A | 4/1926 | Runyan | |
| 1,590,988 A | 6/1926 | Campbell | |
| 1,600,604 A | 9/1926 | Sorlien | |
| 1,616,478 A | 2/1927 | Watson | |
| 1,662,372 A | 3/1927 | Ward | |
| 1,640,517 A | 8/1927 | Procknow | |
| 1,701,948 A | 2/1929 | Crowe | |
| 1,711,490 A | 5/1929 | Drummond | |
| 1,712,828 A | 5/1929 | Klehm | |
| 1,774,521 A | 9/1930 | Neighbour | |
| 1,807,120 A | 5/1931 | Lewis | |
| 1,811,066 A | 6/1931 | Tannewitz | |
| 1,879,280 A | 9/1932 | James | |
| 1,896,924 A | 2/1933 | Ulrich | |
| 1,902,270 A | 3/1933 | Tate | |
| 1,904,005 A | 4/1933 | Masset | |
| 1,910,651 A | 5/1933 | Tautz | |
| 1,938,548 A | 12/1933 | Tautz | |
| 1,938,549 A | 12/1933 | Tautz | |
| 1,963,688 A | 6/1934 | Tautz | |
| 1,988,102 A | 1/1935 | Woodward | |
| 1,993,219 A | 3/1935 | Merrigan | |
| 2,007,887 A | 7/1935 | Tautz | |
| 2,010,851 A | 8/1935 | Drummond | |
| 2,020,222 A | 11/1935 | Tautz | |
| 2,038,810 A | 4/1936 | Tautz | |
| 2,075,282 A | 3/1937 | Hedgpeth | |
| 2,095,330 A | 10/1937 | Hedgpeth | |
| 2,106,288 A | 1/1938 | Tautz | |
| 2,106,321 A | 1/1938 | Guertin | |
| 2,121,069 A | 6/1938 | Collins | |
| 2,131,492 A | 9/1938 | Ocenasek | |
| 2,163,320 A | 6/1939 | Hammond | |
| 2,168,282 A | 8/1939 | Tautz | |
| 2,241,556 A | 5/1941 | MacMillin et al. | |
| 2,261,696 A | 11/1941 | Ocenasek | |
| 2,265,407 A | 12/1941 | Tautz | |
| 2,286,589 A | 6/1942 | Tannewitz | |
| 2,292,872 A | 8/1942 | Eastman | |
| 2,299,262 A | 10/1942 | Uremovich | |
| 2,312,118 A | 2/1943 | Neisewander | |
| 2,313,686 A | 3/1943 | Uremovich | |
| 2,328,244 A | 8/1943 | Woodward | |
| 2,352,235 A | 6/1944 | Tautz | |
| 2,377,265 A | 3/1945 | Rady | |
| 2,392,486 A | 1/1946 | Larsen | |
| 2,402,232 A | 6/1946 | Baker | |
| 2,425,331 A | 8/1947 | Kramer | |
| 2,434,174 A | 1/1948 | Morgan | |
| 2,452,589 A | 11/1948 | McWhirter et al. | |
| 2,466,325 A | 4/1949 | Ocenasek | |
| 2,496,613 A | 2/1950 | Woodward | |
| 2,509,813 A | 2/1950 | Dineen | |
| 2,517,649 A | 8/1950 | Frechtmann | |
| 2,518,684 A | 8/1950 | Harris | |
| 2,530,290 A | 11/1950 | Collins | |
| 2,554,124 A | 5/1951 | Salmont | |
| 2,562,396 A | 7/1951 | Schutz | |
| 2,572,326 A | 10/1951 | Evans | |
| 2,590,035 A | 3/1952 | Pollak | |
| 2,593,596 A | 4/1952 | Olson | |
| 2,601,878 A | 7/1952 | Anderson | |
| 2,623,555 A | 12/1952 | Eschenburg | |
| 2,625,966 A | 1/1953 | Copp | |
| 2,626,639 A | 1/1953 | Hess | |
| 2,661,777 A | 12/1953 | Hitchcock | |
| 2,661,780 A | 12/1953 | Morgan | |
| 2,675,707 A | 4/1954 | Brown | |
| 2,678,071 A | 5/1954 | Odlum et al. | |
| 2,690,084 A | 9/1954 | Van Dam | |
| 2,695,638 A | 11/1954 | Gaskell | |
| 2,704,560 A | 3/1955 | Woessner | |
| 2,711,762 A | 6/1955 | Gaskell | |
| 2,722,246 A | 11/1955 | Arnoldy | |
| 2,731,049 A | 1/1956 | Akin | |
| 2,736,348 A | 2/1956 | Nelson | |
| 2,737,213 A | 3/1956 | Richards et al. | |
| 2,758,615 A | 8/1956 | Mastriforte | |
| 2,785,710 A | 3/1957 | Mowery, Jr | |
| 2,786,496 A | 3/1957 | Eschenburg | |
| 2,810,408 A | 10/1957 | Boice et al. | |
| 2,839,943 A | 6/1958 | Caldwell et al. | |
| 2,844,173 A | 7/1958 | Gaskell | |
| 2,850,054 A | 9/1958 | Eschenburg | |
| 2,852,047 A | 9/1958 | Odlum et al. | |
| 2,873,773 A | 2/1959 | Gaskell | |
| 2,876,809 A | 3/1959 | Rentsch et al. | |
| 2,883,486 A | 4/1959 | Mason | |
| 2,894,546 A | 7/1959 | Eschenburg | |
| 2,913,025 A | 11/1959 | Richards | |
| 2,913,581 A | 11/1959 | Simonton et al. | |
| 2,945,516 A | 7/1960 | Edgemond, Jr. et al. | |
| 2,954,118 A | 9/1960 | Anderson | |
| 2,957,166 A | 10/1960 | Gluck | |
| 2,978,084 A | 4/1961 | Vilkaitis | |
| 2,984,268 A | 5/1961 | Vuichard | |
| 2,991,593 A | 7/1961 | Cohen | |
| 3,005,477 A | 10/1961 | Sherwen | |
| 3,011,529 A | 12/1961 | Copp | |
| 3,011,610 A | 12/1961 | Stiebel et al. | |
| 3,013,592 A | 12/1961 | Ambrosio et al. | |
| 3,021,881 A | 2/1962 | Edgemond, Jr. et al. | |
| 3,035,995 A | 5/1962 | Seeley et al | |
| 3,047,116 A | 7/1962 | Stiebel et al. | |
| 3,085,602 A | 4/1963 | Gaskell | |
| 3,105,530 A | 10/1963 | Peterson | |
| 3,129,731 A | 4/1964 | Tyrrell | |
| 3,163,732 A | 12/1964 | Abbott | |
| 3,184,001 A | 5/1965 | Reinsch et al. | |
| 3,186,256 A | 6/1965 | Reznick | |
| 3,207,273 A | 9/1965 | Jurin | |
| 3,213,731 A | 10/1965 | Renard | |
| 3,224,474 A | 12/1965 | Bloom | |
| 3,232,326 A | 2/1966 | Speer et al. | |
| 3,246,205 A | 4/1966 | Miller | |

| | | | | | |
|---|---|---|---|---|---|
| 3,249,134 A | 5/1966 | Vogl et al. | 4,075,961 A | 2/1978 | Harris |
| 3,276,497 A | 10/1966 | Heer | 4,077,161 A | 3/1978 | Wyle et al. |
| 3,306,149 A | 2/1967 | John | 4,085,303 A | 4/1978 | McIntyre et al. |
| 3,313,185 A | 4/1967 | Drake et al | 4,090,345 A | 5/1978 | Harkness |
| 3,315,715 A | 4/1967 | Mytinger | 4,091,698 A | 5/1978 | Obear et al. |
| 3,323,814 A | 6/1967 | Phillips | 4,106,378 A | 8/1978 | Kaiser |
| 3,337,008 A | 8/1967 | Trachte | 4,117,752 A | 10/1978 | Yoneda |
| 3,356,111 A | 12/1967 | Mitchell | 4,145,940 A | 3/1979 | Woloveke et al. |
| 3,386,322 A | 6/1968 | Stone et al. | 4,152,833 A | 5/1979 | Phillips |
| 3,439,183 A | 4/1969 | Hurst, Jr | 4,161,649 A | 7/1979 | Klos et al. |
| 3,445,835 A | 5/1969 | Fudaley | 4,175,452 A | 11/1979 | Idel |
| 3,454,286 A | 7/1969 | Anderson et al. | 4,190,000 A | 2/1980 | Shaull et al. |
| 3,456,696 A | 7/1969 | Gregory et al. | 4,195,722 A | 4/1980 | Anderson et al. |
| 3,512,440 A | 5/1970 | Frydmann | 4,199,930 A | 4/1980 | Lebet et al. |
| 3,538,964 A | 11/1970 | Warrick et al. | 4,206,666 A | 6/1980 | Ashton |
| 3,540,338 A | 11/1970 | McEwan et al. | 4,206,910 A | 6/1980 | Biesemeyer |
| 3,554,067 A | 1/1971 | Scutella | 4,249,117 A | 2/1981 | Leukhardt et al. |
| 3,566,996 A | 3/1971 | Crossman | 4,249,442 A | 2/1981 | Fittery |
| 3,580,376 A | 5/1971 | Loshbough | 4,262,278 A | 4/1981 | Howard et al. |
| 3,581,784 A | 6/1971 | Warrick | 4,267,914 A | 5/1981 | Saar |
| 3,593,266 A | 7/1971 | Van Sickle | 4,270,427 A | 6/1981 | Colberg et al. |
| 3,613,748 A | 10/1971 | De Pue | 4,276,459 A | 6/1981 | Willett et al. |
| 3,621,894 A | 11/1971 | Niksich | 4,276,799 A | 7/1981 | Muehling |
| 3,670,788 A | 6/1972 | Pollak et al. | 4,291,794 A | 9/1981 | Bauer |
| 3,675,444 A | 7/1972 | Whipple | 4,305,442 A | 12/1981 | Currie |
| 3,680,609 A | 8/1972 | Menge | 4,321,841 A | 3/1982 | Felix |
| 3,688,815 A | 9/1972 | Ridenour | 4,372,202 A | 2/1983 | Cameron |
| 3,695,116 A | 10/1972 | Baur | 4,391,358 A | 7/1983 | Haeger |
| 3,696,844 A | 10/1972 | Barnatschek | 4,418,597 A | 12/1983 | Krusemark et al. |
| 3,716,113 A | 2/1973 | Kobayashi et al. | 4,427,042 A | 1/1984 | Mitchell et al. |
| 3,719,103 A | 3/1973 | Streander | 4,466,170 A | 8/1984 | Davis |
| 3,745,546 A | 7/1973 | Struger et al. | 4,466,233 A | 8/1984 | Thesman |
| 3,749,933 A | 7/1973 | Davidson | 4,470,046 A | 9/1984 | Betsill |
| 3,754,493 A | 8/1973 | Niehaus et al. | 4,510,489 A | 4/1985 | Anderson, III et al. |
| 3,772,590 A | 11/1973 | Mikulecky et al. | 4,512,224 A | 4/1985 | Terauchi |
| 3,785,230 A | 1/1974 | Lokey | 4,518,043 A | 5/1985 | Anderson et al. |
| 3,793,915 A | 2/1974 | Hujer | 4,532,501 A | 7/1985 | Hoffman |
| 3,805,639 A | 4/1974 | Peter | 4,532,844 A | 8/1985 | Chang et al. |
| 3,805,658 A | 4/1974 | Scott et al. | 4,557,168 A | 12/1985 | Tokiwa |
| 3,808,932 A | 5/1974 | Russell | 4,559,858 A | 12/1985 | Laskowski et al. |
| 3,829,850 A | 8/1974 | Guetersloh | 4,560,033 A | 12/1985 | DeWoody et al. |
| 3,829,970 A | 8/1974 | Anderson | 4,566,512 A | 1/1986 | Wilson |
| 3,858,095 A | 12/1974 | Friemann et al. | 4,573,556 A | 3/1986 | Andreasson |
| 3,861,016 A | 1/1975 | Johnson et al. | 4,576,073 A | 3/1986 | Stinson |
| 3,863,208 A | 1/1975 | Balban | 4,589,047 A | 5/1986 | Gaus et al. |
| 3,880,032 A | 4/1975 | Green | 4,589,860 A | 5/1986 | Brandenstein et al. |
| 3,882,744 A | 5/1975 | McCarroll | 4,599,597 A | 7/1986 | Rotbart |
| 3,886,413 A | 5/1975 | Dow et al. | 4,599,927 A | 7/1986 | Eccardt et al. |
| 3,889,567 A | 6/1975 | Sato et al. | 4,606,251 A | 8/1986 | Boileau |
| 3,922,785 A | 12/1975 | Fushiya | 4,615,247 A | 10/1986 | Berkeley |
| 3,924,688 A | 12/1975 | Cooper et al. | 4,621,300 A | 11/1986 | Summerer |
| 3,931,727 A | 1/1976 | Luenser | 4,625,604 A | 12/1986 | Handler et al. |
| 3,935,777 A | 2/1976 | Bassett | 4,637,188 A | 1/1987 | Crothers |
| 3,945,286 A | 3/1976 | Smith | 4,637,289 A | 1/1987 | Ramsden |
| 3,946,631 A | 3/1976 | Malm | 4,644,832 A | 2/1987 | Smith |
| 3,947,734 A | 3/1976 | Fyler | 4,653,189 A | 3/1987 | Andreasson |
| 3,949,636 A | 4/1976 | Ball et al. | 4,657,428 A | 4/1987 | Wiley |
| 3,953,770 A | 4/1976 | Hayashi | 4,672,500 A | 6/1987 | Tholome et al. |
| 3,960,310 A | 6/1976 | Nussbaum | 4,675,664 A | 6/1987 | Cloutier et al. |
| 3,967,161 A | 6/1976 | Lichtblau | 4,679,719 A | 7/1987 | Kramer |
| 3,974,565 A | 8/1976 | Ellis | 4,722,021 A | 1/1988 | Hornung et al. |
| 3,975,600 A | 8/1976 | Marston | 4,751,603 A | 6/1988 | Kwan |
| 3,978,624 A | 9/1976 | Merkel et al. | 4,756,220 A | 7/1988 | Olsen et al. |
| 3,994,192 A | 11/1976 | Faig | 4,757,881 A | 7/1988 | Jonsson et al. |
| 4,007,679 A | 2/1977 | Edwards | 4,774,866 A | 10/1988 | Dehari et al. |
| 4,016,490 A | 4/1977 | Weckenmann et al. | 4,792,965 A | 12/1988 | Morgan |
| 4,026,174 A | 5/1977 | Fierro | 4,805,504 A | 2/1989 | Fushiya et al. |
| 4,026,177 A | 5/1977 | Lokey | 4,831,279 A | 5/1989 | Ingraham |
| 4,029,159 A | 6/1977 | Nymann | 4,840,135 A | 6/1989 | Yamauchi |
| 4,047,156 A | 9/1977 | Atkins | 4,845,476 A | 7/1989 | Rangeard et al. |
| 4,048,886 A | 9/1977 | Zettler | 4,864,455 A | 9/1989 | Shimomura et al. |
| 4,060,160 A | 11/1977 | Lieber | 4,875,398 A | 10/1989 | Taylor et al. |
| 4,070,940 A | 1/1978 | McDaniel et al. | 4,896,607 A | 1/1990 | Hall et al. |

| | | | | | |
|---|---|---|---|---|---|
| 4,906,962 A | 3/1990 | Duimstra | 5,659,454 A | 8/1997 | Vermesse |
| 4,907,679 A | 3/1990 | Menke | 5,667,152 A | 9/1997 | Mooring |
| 4,934,233 A | 6/1990 | Brundage et al. | 5,671,633 A | 9/1997 | Wagner |
| 4,936,876 A | 6/1990 | Reyes | 5,695,306 A | 12/1997 | Nygren, Jr. |
| 4,937,554 A | 6/1990 | Herman | 5,700,165 A | 12/1997 | Harris et al. |
| 4,964,450 A | 10/1990 | Hughes et al. | 5,722,308 A | 3/1998 | Ceroll et al. |
| 4,965,909 A | 10/1990 | McCullough et al. | 5,724,875 A | 3/1998 | Meredith et al. |
| 4,975,798 A | 12/1990 | Edwards et al. | 5,730,165 A | 3/1998 | Philipp |
| 5,020,406 A | 6/1991 | Sasaki et al. | 5,741,048 A | 4/1998 | Eccleston |
| 5,025,175 A | 6/1991 | Dubois, III | 5,755,148 A | 5/1998 | Stumpf et al. |
| 5,042,348 A | 8/1991 | Brundage et al. | 5,771,742 A | 6/1998 | Bokaie et al. |
| 5,046,426 A | 9/1991 | Julien et al. | 5,782,001 A | 7/1998 | Gray |
| 5,052,255 A | 10/1991 | Gaines | 5,787,779 A | 8/1998 | Garuglieri |
| 5,074,047 A | 12/1991 | King | 5,791,057 A | 8/1998 | Nakamura et al. |
| 5,081,406 A | 1/1992 | Hughes et al. | 5,791,223 A | 8/1998 | Lanzer |
| 5,082,316 A | 1/1992 | Wardlaw | 5,791,224 A | 8/1998 | Suzuki et al. |
| 5,083,973 A | 1/1992 | Townsend | 5,791,441 A | 8/1998 | Matos et al. |
| 5,086,890 A | 2/1992 | Turczyn et al. | 5,819,619 A | 10/1998 | Miller et al. |
| 5,094,000 A | 3/1992 | Becht et al. | 5,852,951 A | 12/1998 | Santi |
| 5,116,249 A | 5/1992 | Shiotani et al. | 5,857,507 A | 1/1999 | Puzio et al. |
| 5,119,555 A | 6/1992 | Johnson | 5,861,809 A | 1/1999 | Eckstein et al. |
| 5,122,091 A | 6/1992 | Townsend | 5,875,698 A | 3/1999 | Ceroll et al. |
| 5,174,349 A | 12/1992 | Svetlik et al. | 5,880,954 A | 3/1999 | Thomson et al. |
| 5,184,534 A | 2/1993 | Lee | 5,921,367 A | 7/1999 | Kashioka et al. |
| 5,198,702 A | 3/1993 | McCullough et al. | 5,927,857 A | 7/1999 | Ceroll et al. |
| 5,199,343 A | 4/1993 | O'Banion | 5,930,096 A | 7/1999 | Kim |
| 5,201,110 A | 4/1993 | Bane | 5,937,720 A | 8/1999 | Itzov |
| 5,201,684 A | 4/1993 | DeBois, III | 5,942,975 A | 8/1999 | Sorensen |
| 5,206,625 A | 4/1993 | Davis | 5,943,932 A | 8/1999 | Sberveglieri |
| 5,207,253 A | 5/1993 | Hoshino et al. | 5,950,514 A | 9/1999 | Benedict et al. |
| 5,212,621 A | 5/1993 | Panter | 5,963,173 A | 10/1999 | Lian et al. |
| 5,218,189 A | 6/1993 | Hutchison | 5,974,927 A | 11/1999 | Tsune |
| 5,231,359 A | 7/1993 | Masuda et al. | 5,989,116 A | 11/1999 | Johnson et al. |
| 5,231,906 A | 8/1993 | Kogej | 6,009,782 A | 1/2000 | Tajima et al. |
| 5,239,978 A | 8/1993 | Plangetis | 6,018,284 A | 1/2000 | Rival et al. |
| 5,245,879 A | 9/1993 | McKeon | 6,037,729 A | 3/2000 | Woods et al. |
| 5,257,570 A | 11/1993 | Shiotani et al. | D422,290 S | 4/2000 | Welsh et al. |
| 5,265,510 A | 11/1993 | Hoyer-Ellefsen | 6,052,884 A | 4/2000 | Steckler et al. |
| 5,272,946 A | 12/1993 | McCullough et al. | 6,062,121 A | 5/2000 | Ceroll et al. |
| 5,276,431 A | 1/1994 | Piccoli et al. | 6,070,484 A | 6/2000 | Sakamaki |
| 5,285,708 A | 2/1994 | Bosten et al. | 6,095,092 A | 8/2000 | Chou |
| 5,293,802 A | 3/1994 | Shiotani et al. | 6,112,785 A | 9/2000 | Yu |
| 5,320,382 A | 6/1994 | Goldstein et al. | 6,119,984 A | 9/2000 | Devine |
| 5,321,230 A | 6/1994 | Shanklin et al. | 6,131,629 A | 10/2000 | Puzio et al. |
| 5,331,875 A | 7/1994 | Mayfield | 6,133,818 A | 10/2000 | Shieh et al. |
| 5,353,670 A | 10/1994 | Metzger, Jr. | 6,141,192 A | 10/2000 | Garzon |
| 5,377,554 A | 1/1995 | Reulein et al. | 6,148,504 A | 11/2000 | Schmidt et al. |
| 5,377,571 A | 1/1995 | Josephs | 6,148,703 A | 11/2000 | Ceroll et al. |
| 5,392,568 A | 2/1995 | Howard, Jr. et al. | 6,150,826 A | 11/2000 | Hokodate et al. |
| 5,392,678 A | 2/1995 | Sasaki et al. | 6,161,459 A | 12/2000 | Ceroll et al. |
| 5,401,928 A | 3/1995 | Kelley | 6,170,370 B1 | 1/2001 | Sommerville |
| 5,411,221 A | 5/1995 | Collins et al. | 6,244,149 B1 | 6/2001 | Ceroll et al. |
| 5,423,232 A | 6/1995 | Miller et al. | 6,250,190 B1 | 6/2001 | Ceroll et al. |
| 5,436,613 A | 7/1995 | Ghosh et al. | 6,257,061 B1 | 7/2001 | Nonoyama et al. |
| 5,447,085 A | 9/1995 | Gochnauer | 6,302,527 B1 | 10/2001 | Walker |
| 5,451,750 A | 9/1995 | An | 6,312,106 B1 | 11/2001 | Walker |
| 5,453,903 A | 9/1995 | Chow | 6,325,195 B1 | 12/2001 | Doherty |
| 5,471,888 A | 12/1995 | McCormick | 6,330,848 B1 | 12/2001 | Nishio et al. |
| 5,480,009 A | 1/1996 | Wieland et al. | 6,336,273 B1 | 1/2002 | Nilsson et al. |
| 5,503,059 A | 4/1996 | Pacholok | 6,352,137 B1 | 3/2002 | Stegall et al. |
| 5,510,587 A | 4/1996 | Reiter | 6,357,328 B1 | 3/2002 | Ceroll et al. |
| 5,510,685 A | 4/1996 | Grasselli | 6,366,099 B1 | 4/2002 | Reddi |
| 5,513,548 A | 5/1996 | Garuglieri | 6,376,939 B1 | 4/2002 | Suzuki et al. |
| 5,531,147 A | 7/1996 | Serban | 6,404,098 B1 | 6/2002 | Kayama et al. |
| 5,534,836 A | 7/1996 | Schenkel et al. | 6,405,624 B2 | 6/2002 | Sutton |
| 5,572,916 A | 11/1996 | Takano | 6,418,829 B1 | 7/2002 | Pilchowski |
| 5,587,618 A | 12/1996 | Hathaway | 6,420,814 B1 | 7/2002 | Bobbio |
| 5,592,353 A | 1/1997 | Shinohara et al. | 6,427,570 B1 | 8/2002 | Miller et al. |
| 5,606,889 A | 3/1997 | Bielinski et al. | 6,430,007 B1 | 8/2002 | Jabbari |
| 5,619,896 A | 4/1997 | Chen | 6,431,425 B1 | 8/2002 | Moorman et al. |
| 5,623,860 A | 4/1997 | Schoene et al. | 6,450,077 B1 | 9/2002 | Ceroll et al. |
| 5,647,258 A | 7/1997 | Brazell et al. | 6,453,786 B1 | 9/2002 | Ceroll et al. |
| 5,648,644 A | 7/1997 | Nagel | 6,460,442 B2 | 10/2002 | Talesky et al. |

| | | |
|---|---|---|
| 6,467,888 B2 | 10/2002 | Wheeler et al. |
| 6,471,106 B1 | 10/2002 | Reining |
| 6,479,958 B2 | 11/2002 | Thompson et al. |
| 6,484,614 B1 | 11/2002 | Huang |
| D466,913 S | 12/2002 | Ceroll et al. |
| 6,492,802 B1 | 12/2002 | Bielski |
| D469,354 S | 1/2003 | Curtsinger |
| 6,502,493 B1 | 1/2003 | Eccardt et al. |
| 6,536,536 B1 | 3/2003 | Gass et al. |
| 6,543,324 B2 | 4/2003 | Dils |
| 6,546,835 B2 | 4/2003 | Wang |
| 6,564,909 B1 | 5/2003 | Razzano |
| 6,575,067 B2 | 6/2003 | Parks et al. |
| 6,578,460 B2 | 6/2003 | Sartori |
| 6,578,856 B2 | 6/2003 | Kahle |
| 6,581,655 B2 | 6/2003 | Huang |
| 6,595,096 B2 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B2 | 9/2003 | Wang |
| 6,640,683 B2 | 11/2003 | Lee |
| 6,644,157 B2 | 11/2003 | Huang |
| 6,644,771 B1 | 11/2003 | Silverbrook |
| 6,647,847 B2 | 11/2003 | Hewitt et al. |
| 6,659,233 B2 | 12/2003 | DeVlieg |
| 6,684,750 B2 | 2/2004 | Yu |
| 6,722,242 B2 | 4/2004 | Chuang |
| 6,734,581 B1 | 5/2004 | Griffis |
| 6,736,042 B2 | 5/2004 | Behne et al. |
| 6,742,430 B2 | 6/2004 | Chen |
| 6,748,182 B2 | 6/2004 | Yoshida et al. |
| 6,789,864 B2 | 9/2004 | Phillips |
| 6,796,208 B1 | 9/2004 | Jorgensen |
| 6,800,819 B2 | 10/2004 | Sato et al. |
| 6,826,988 B2 | 12/2004 | Gass et al. |
| 6,826,992 B1 | 12/2004 | Huang |
| 6,840,144 B2 | 1/2005 | Huang |
| 6,854,371 B2 | 2/2005 | Yu |
| 6,857,345 B2 | 2/2005 | Gass et al. |
| 6,863,364 B2 | 3/2005 | Russell et al. |
| 6,863,377 B2 | 3/2005 | Walker et al. |
| 6,874,397 B2 | 4/2005 | Chang |
| 6,874,399 B2 | 4/2005 | Lee |
| 6,877,410 B2 | 4/2005 | Gass et al. |
| 6,880,440 B2 | 4/2005 | Gass et al. |
| 6,883,397 B2 | 4/2005 | Kimizuka |
| 6,889,585 B1 | 5/2005 | Harris et al. |
| 6,920,814 B2 | 7/2005 | Gass et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,968,767 B2 | 11/2005 | Yu |
| 6,986,370 B1 | 1/2006 | Schoene et al. |
| 6,994,004 B2 | 2/2006 | Gass et al. |
| 6,997,090 B2 | 2/2006 | Gass et al. |
| 7,000,514 B2 | 2/2006 | Gass et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0043776 A1 | 4/2002 | Chuang |
| 2002/0050201 A1 | 5/2002 | Lane et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0069734 A1 | 6/2002 | Gass et al. |
| 2002/0096030 A1 | 7/2002 | Wang |
| 2002/0109036 A1 | 8/2002 | Denen et al. |
| 2002/0170399 A1 | 11/2002 | Gass et al. |
| 2002/0170400 A1 | 11/2002 | Gass |
| 2002/0190581 A1 | 12/2002 | Gass et al. |
| 2003/0000359 A1 | 1/2003 | Eccardt et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0019341 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2004/0011177 A1 | 1/2004 | Huang |
| 2004/0040426 A1 | 3/2004 | Gass et al. |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0066784 A1 | 3/2005 | Gass |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |

FOREIGN PATENT DOCUMENTS

| | | |
|---|---|---|
| DE | 76186 | 8/1921 |
| DE | 2800403 * | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| EP | 0 988 479 B1 | 11/2003 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |

GB 2142571 1/1985

OTHER PUBLICATIONS

Shop Fox® Fence Operating Manual, Woodstock International, Inc., 1996, revised May 1997.
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Company, Sep. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Laguna Tools table saw owner's manual, date unknown.
Gordon Engineering Corp., Product Catalog, Oct. 1997, pgs. cover, 1, 3 and back, Brookfield, Connecticut, US.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
*You Should Have Invented It*, French television show video.

\* cited by examiner

Fig. 7
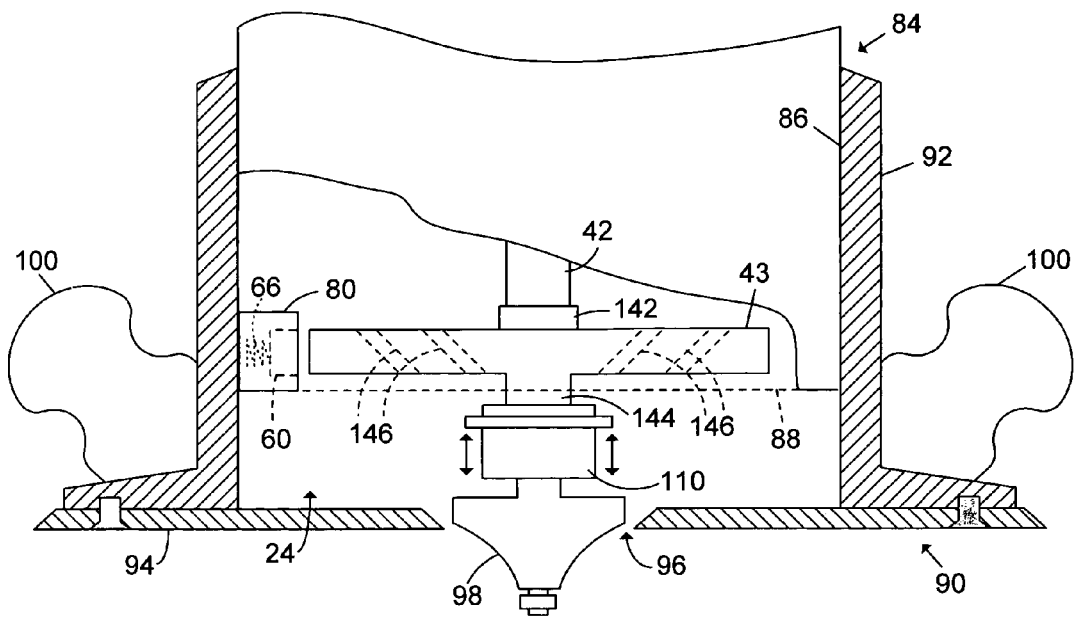
Fig. 8
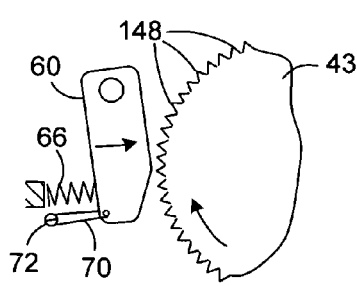
Fig. 9

ROUTER WITH IMPROVED SAFETY SYSTEM

CROSS-REFERENCE TO RELATED APPLICATIONS

This application is a continuation of and claims priority to U.S. patent application Ser. No. 10/251,576, filed Sep. 20, 2002 now Abandoned, which is a continuation-in-part of U.S. patent application Ser. No. 10/197,975, filed Jul. 18, 2002 now Abandoned, and which claimed the benefit of and priority from U.S. Provisional Patent Application Ser. No. 60/323,975, filed Sep. 21, 2001. This application is also a continuation-in-part of and claims priority to U.S. patent application Ser. No. 09/676,190, filed Sep. 29, 2000 now U.S. Pat. No. 7,055,417.

All of the above applications are hereby incorporated by reference in their entirety for all purposes.

FIELD

The present invention relates to routers, and more particularly to a router with a high-speed safety system.

BACKGROUND

Routers are a type of woodworking machinery used to cut wood, plastic and other materials. Routers typically include a generally cylindrical housing enclosing a motor, and a rotatable shaft or spindle driven by the motor and extending from one end of the housing. A variety of router bits having different shapes are available and may be coupled to the shaft to perform different types of cuts. In some applications, a router is mounted to a rear side of a workpiece support surface so that the router bit extends through a hole in the support surface. A user then places a workpiece on the support surface and slides the workpiece against the router bit to cut the workpiece. In other applications, a base assembly is attached to the router to allow the router to be slid over the top of a workpiece. The router bit extends through a hole in the base assembly to cut the underlying workpiece. Routers present a risk of injury to users because the spinning router bit is usually exposed during use. Thus, any contact between a user's body and the spinning router bit can cause serious injury.

The present invention provides a router with an improved safety system that is adapted to detect the occurrence of one or more dangerous, or triggering, conditions during use of the router, such as when a user's body contacts the spinning router bit. When such a condition occurs, the safety system is actuated to limit or even prevent injury to the user.

BRIEF DESCRIPTION OF THE DRAWINGS

FIG. 7 is a schematic side elevation and partial cross-sectional view of a router with another alternative safety system according to the present invention.

FIG. 8 is a partial schematic view showing an exemplary brake pawl and brake engagement structure.

FIG. 9 is a partial schematic view showing an alternative brake pawl and brake engagement structure.

DETAILED DESCRIPTION

Figure 1:
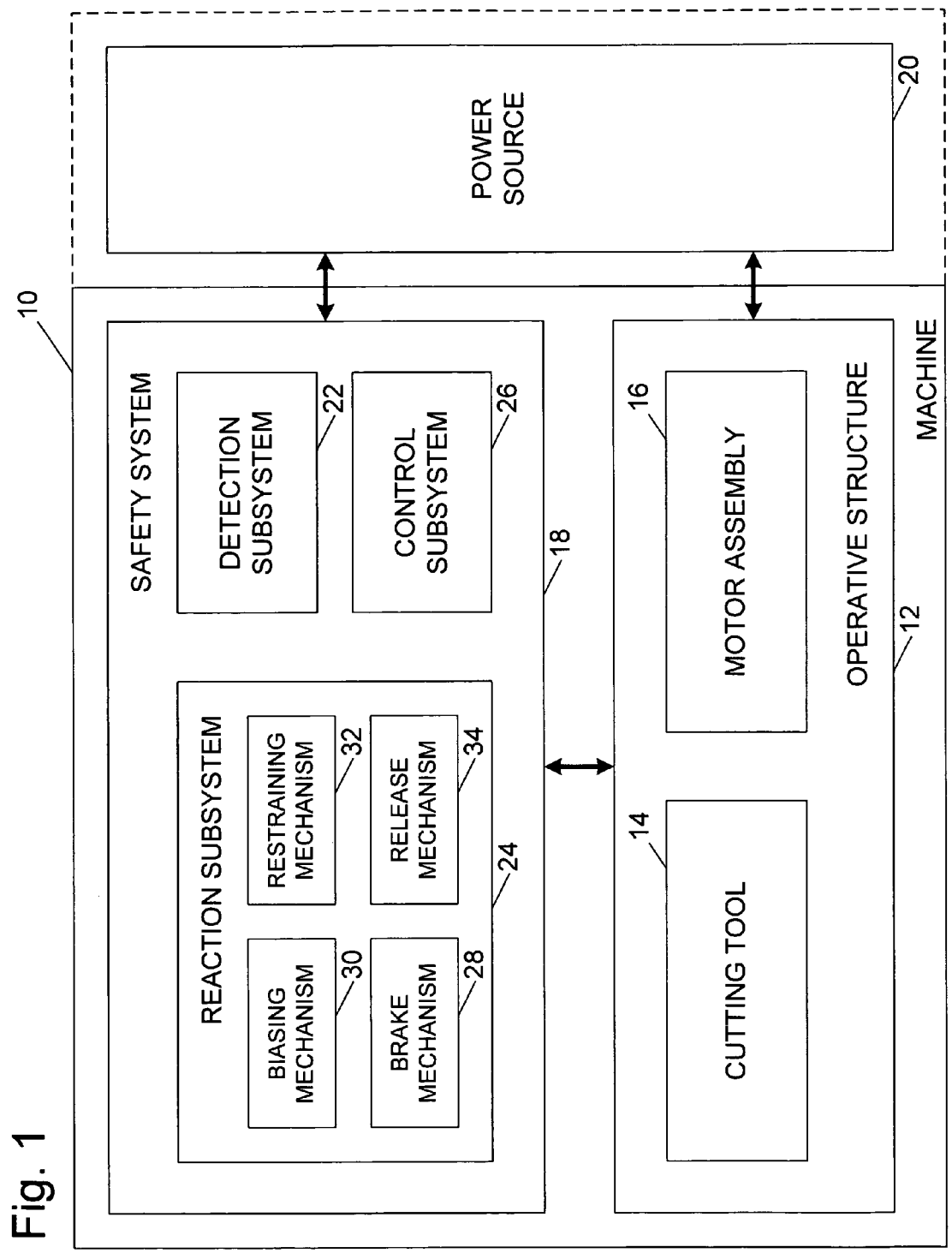
FIG. 1 is a schematic block diagram of a router with a fast-acting safety system according to the present invention.

A router according to the present invention is shown schematically in FIG. 1 and indicated generally at 10. Router 10 may be any of a variety of different types and configurations of router adapted for cutting workpieces, such as wood, plastic, etc. Router 10 includes an operative structure 12 having a cutting tool 14 and a motor assembly 16 adapted to drive the cutting tool. Router 10 also includes a safety system 18 configured to minimize the potential of a serious injury to a person using router 10. Safety system 18 is adapted to detect the occurrence of one or more dangerous, or triggering, conditions during use of router 10. If such a dangerous condition is detected, safety system 18 is adapted to engage operative structure 12 to limit any injury to the user caused by the dangerous condition.

Router 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of router 10.

It will be appreciated that operative structure 12 may take any one of many different forms, depending on the type of router 10. As will be described in more detail below, operative structure 12 typically takes the form of a rotatable shaft configured to couple cutting tool 14 to motor assembly 16. The motor assembly includes one or more motors adapted to drive the cutting tool. The motors may be either directly or indirectly coupled to the cutting tool by operative structure 12.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of router 10. In addition, control subsystem 26 typically includes one or more instruments operable by a user to control the router. The control subsystem is configured to control router 10 in response to the inputs it receives.

Detection subsystem 22 is configured to detect one or more dangerous, or triggering, conditions during use of router 10. For example, the detection subsystem may be configured to detect that a portion of the user's body is dangerously close to, or in contact with, a portion of cutting tool 14. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of router 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, filed Aug. 14, 2000, the disclosure of which is herein incorporated by reference. Retraction of the cutting tool from its operating position is described in more detail in U.S. Provisional Patent Application Ser. No. 60/225,089, filed Aug. 14, 2000, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of router 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
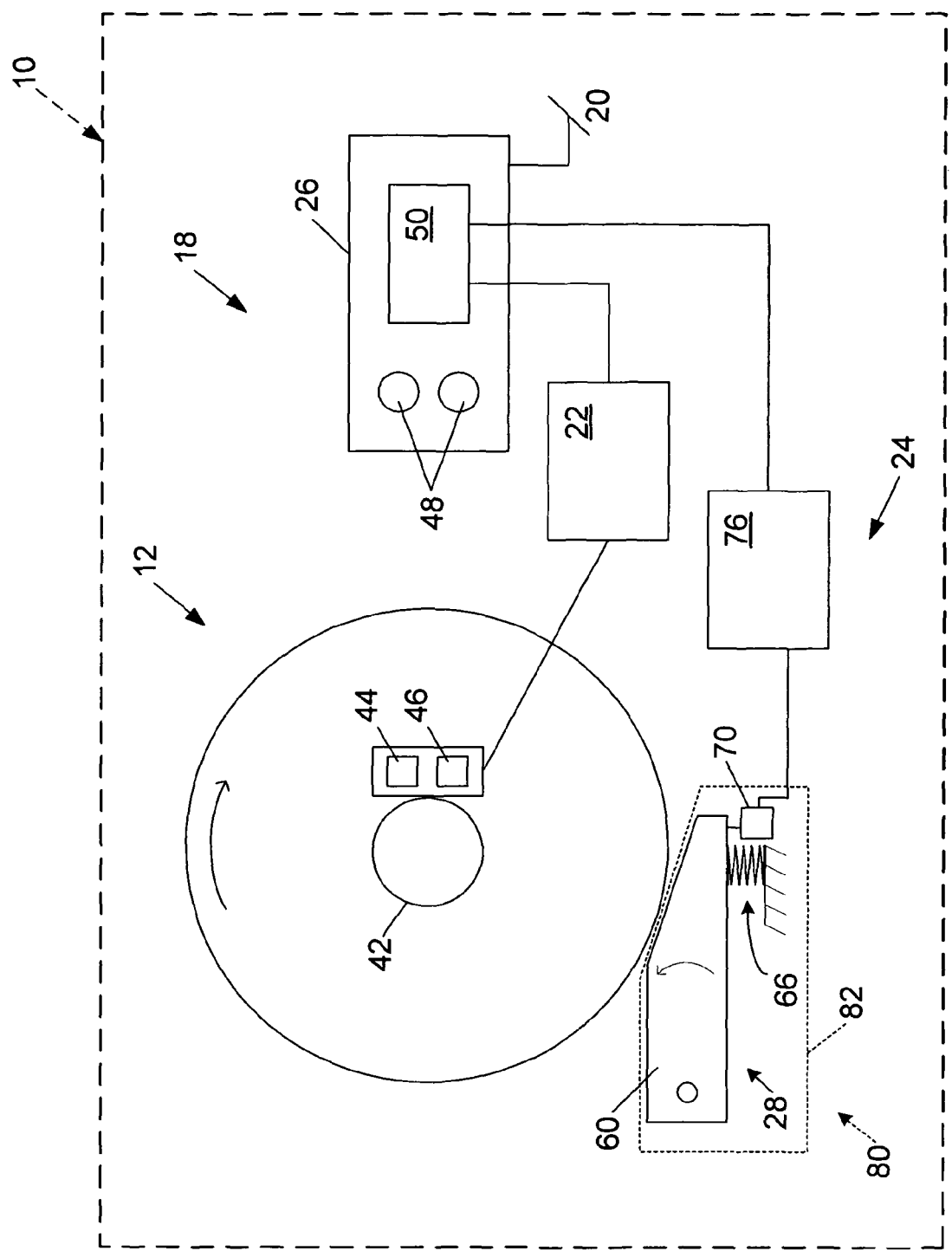
FIG. 2 is a schematic diagram of an exemplary safety system configured to stop the rotation of the router bit.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of router 10 includes an operative structure having a motor-driven spindle 42, and a generally circular brake engagement structure 43 concentrically coupled to the spindle. During operation, any standard router bit (not shown) or other cutting tool is also coupled to the spindle. As described in more detail below, brake mechanism 28 is adapted to engage brake engagement structure 43 and stop the rotation of both the brake engagement structure and the router bit. Alternatively, the brake engagement structure may be integrally formed with the router bit to form a unitary element.

In the exemplary implementation, detection subsystem 22 is adapted to detect the dangerous condition of the user coming into contact with the router bit. The detection subsystem includes a sensor assembly, such as contact detection plates 44 and 46, which are capacitively coupled to the router bit to detect any contact between the router bit and a user's body. Typically, the router bit, or some larger portion of operative structure 12, is electrically isolated from the remainder of router 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, U.S. Provisional Patent Application Ser. No. 60/225,211, filed Aug. 14, 2000, U.S. Provisional Patent Application Ser. No. 60/270,011, filed Feb. 20, 2001, and U.S. Provisional Patent Application Ser. No. 60/298,207, filed Jun. 13, 2001, the disclosures of which are herein incorporated by reference. Alternatively, U.S. Provisional Patent Application Ser. No. 60/302,937, filed Jul. 2, 2001, the disclosure of which is herein incorporated by reference, describes various embodiments of detection subsystem 22 configured to detect dangerous proximity between a person and the router bit.

Control subsystem 26 includes one or more instruments 48 that are operable by a user to control the motion of the router bit. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as router bit motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the router bit. Various exemplary embodiments and implementations of control subsystem 26 are described in more detail in U.S. Provisional Patent Application Ser. No. 60/225,059, filed Aug. 14, 2000 and U.S. Provisional Patent Application Ser. No. 60/225,094, filed Aug. 14, 2000, the disclosures of which are herein incorporated by reference.

In the exemplary implementation shown in FIG. 2, brake mechanism 28 includes a brake pawl 60 mounted adjacent the edge of brake engagement structure 43 and selectively moveable to engage and grip the brake engagement structure. As will be described in more detail below, pawl 60 may be constructed of any suitable material adapted to engage and stop the brake engagement structure. It will be appreciated that the construction of pawl 60 will vary depending on the configuration of brake engagement structure 43. In any event, the pawl is urged against the brake engagement structure by a biasing mechanism such as a spring 66. It should be understood that sliding or rotary movement of pawl 60 may also be used. The spring is adapted to urge pawl 60 against the brake engagement structure with sufficient force to grip the brake engagement structure and quickly bring it to a stop, thereby stopping the rotation of the router bit.

The pawl is held away from the edge of the brake engagement structure by a restraining mechanism such as a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the brake engagement structure to reduce the distance pawl 60 must travel to engage the brake engagement structure. Positioning the pawl relatively close to the edge of the brake engagement structure reduces the time required for the pawl to engage and stop the brake engagement structure. Typically, the pawl is held approximately ⅟₃₂-inch to ¼-inch from the edge of the brake engagement structure by fusible member 70; however, other spacings may also be used within the scope of the invention.

Pawl 60 is released from its unactuated, or cocked, position to engage the router bit by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. Provisional Patent Application Ser. No. 60/225,169, filed Aug. 14, 2000, and U.S. Provisional Patent Application Ser. No. 60/225,170, filed Aug. 14, 2000, the disclosures of which are herein incorporated by reference.

In some embodiments, activation of the brake mechanism may require the replacement of one or more portions of safety system 18. For example, pawl 60 and fusible member 70 typically are single-use components which must be replaced before the safety system is ready to be used again. Thus, it may be desirable to incorporate one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000 and U.S. Provisional Patent Application Ser. No. 60/225,212, filed Aug. 14, 2000, the disclosures of which are herein incorporated by reference.

In the exemplary embodiment depicted in FIG. 2 and described above, brake mechanism 28 is configured to stop the rotation of the spindle and at least a portion of the motor assembly (e.g., armature, etc.) as well as the router bit. While this configuration has the advantage of simplicity of design, it may require a larger brake pawl to absorb the energy of the spinning spindle and motor armature which are relatively heavy compared to the router bit. Thus, it may be desirable to decouple the router bit from the spindle and motor during braking. This may allow a smaller brake pawl to be used, and may reduce strain on the motor assembly.

Figure 3:
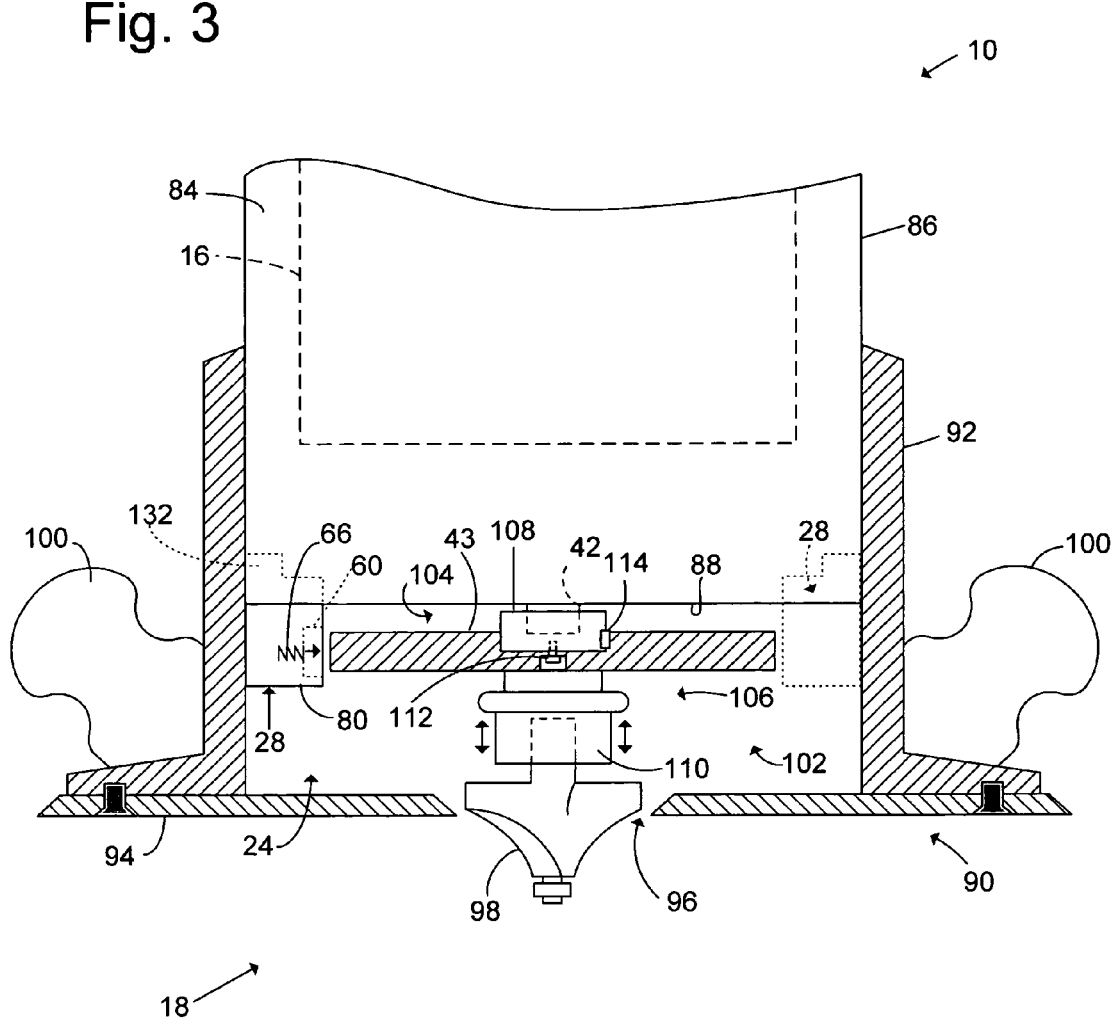
FIG. 3 is a schematic side elevation and partial cross-sectional view of a router with a safety system according to the present invention.

One exemplary configuration of router 10 in which the router bit may be selectively uncoupled from the motor is depicted in FIG. 3. Router 10 includes a main housing 84 enclosing a motor assembly 16. Typically, housing 84 is generally cylindrical having generally circular sides 86 extending from a lower end 88 to an upper end (not shown). Alternatively, housing 84 may be any desired shape or configuration. A rotatable spindle 42 is coupled to the motor assembly and extends through an opening in lower end 88. The motor assembly is adapted to drive the spindle at rotational speeds typically between 3,000 and 30,000 rpm, although other speeds may also be used. Optionally, router 10 may include a variable speed control to allow an operator to select a desired speed.

As shown in FIG. 3, router 10 is coupled to a base assembly 90 adapted to stably support the router on a surface of a workpiece. Base assembly 90 may be any of a variety of base assemblies such as are known in the art. The base assembly typically includes a generally cylindrical shell 92 adapted to fit over, or otherwise couple to, housing 84 adjacent the lower end. Shell 92 may be coupled to housing 84 using a friction fit coupling, or any other suitable mechanism such as screws, etc. The shell extends beyond the lower end to at least partially enclose spindle 42. Portions of shell 92 may be open or transparent to allow an operator to view the area of a workpiece being cut during operation. The axial position of shell 92 relative to housing 84 typically is adjustable to allow the operator to select the distance the base assembly extends beyond the lower end. Optionally, the base assembly may include a support plate 94 mounted to the end of shell 92, and adapted to slide against the surface of a workpiece. Support plate 94 includes an opening 96 which is generally axially aligned with spindle 42, and which is sized to allow the passage of a router bit 98. Base assembly 90 may also include one or more handle members 100 adapted to be gripped by an operator to move the router over the workpiece.

As is well known to those of skill in the art, base assembly 90 is typically used to allow an operator to slide the router over the surface of a stationary workpiece while cutting material from a lateral edge of the workpiece. Alternatively, router 10 may be mounted to the underside of a router table or similar support structure (not shown) so that the router bit extends through a work surface adapted to support a workpiece. In this latter configuration, the operator slides the workpiece over the work surface and against the router bit to cut the workpiece. It will be appreciated by those of skill in the art that safety system 18 may be used with router 10 regardless of whether the router is coupled to base assembly 90 or a router table, etc. Furthermore, while one particular housing assembly has been described above, it will be appreciated that safety system 18 may be adapted as necessary for use with any type of housing assembly.

In the exemplary implementation depicted in FIG. 3, router bit 98 is coupled to spindle 42 through a releasable coupling assembly 102. Releasable coupling assembly 102 is adapted to couple the router bit to the spindle in an axially-fixed and rotationally-fixed position concentric with the spindle. Thus, the motor assembly is indirectly coupled to rotationally drive the router bit through spindle 42 and releasable coupling assembly 102. During normal operation, the releasable coupling assembly imparts the rotation of the spindle to the router bit. However, during braking, the releasable coupling assembly is configured to rotationally uncouple the router bit from the motor assembly so that the router bit may be braked while the motor continues to spin. In other words, releasable coupling assembly 102 is a torque-limiting coupling configured to at least temporarily uncouple the router bit from the motor assembly in response to a high torque load on the router bit and/or releasable coupling assembly. Releasable coupling assembly 102 typically is configured to retain the router bit axially coupled to the spindle or motor assembly to prevent the router bit from leaving the spindle and possibly causing damage to the router or injury to the operator.

It will be appreciated that releasable coupling assembly 102 may be configured to rotationally uncouple the router bit in a variety of different ways such as are known to those of skill in the art. For example, the exemplary releasable coupling assembly depicted in FIG. 3 includes a first or fixed section 104 and a second or releasable section 106. First section 104 is rigidly coupled to the end of spindle 42 that extends out of housing 84. First section 104 includes a cylindrical fitting or cap 108 with an open end threadedly mounted on spindle 42. The direction of the threaded coupling between the spindle and cap 108 may be selected, relative to the rotational direction of the spindle, so that the cap is self-tightening onto the spindle during operation.

Second section 106 is coupled to first section 104 through both an axial coupling mechanism and a rotational coupling mechanism. While the axial coupling mechanism is configured to hold second section 106 securely to first section 104, the rotational coupling mechanism is configured to self-release under specified torque loads. Second section 106 includes a brake engagement structure 43 and a router bit collet or chuck 110. Brake engagement structure 43 is generally disk-shaped with a central bore on one end adapted to fit at least partially over cap 108. The opposing end of brake engagement structure 43 includes a recess adapted to receive a bolt 112, which extends through a hole in the brake engagement structure to threadedly engage the closed end of cap 108. Thus, bolt 112 serves as the axial coupling mechanism to axially couple the brake engagement structure 43 to cap 108. Alternatively, any other suitable mechanism may be used to axially couple the brake engagement structure to the cap.

As mentioned above, cap 108 has a generally cylindrical exterior surface allowing the brake engagement structure to rotate relative to cap 108. Thus, bolt 112 does not rotationally couple brake engagement structure 43 to cap 108. Rather, the brake engagement structure is rotationally coupled to the cap by a releasable coupling member in the form of a shear pin 114. As shown in FIG. 3, shear pin 114 is positioned within aligned recess regions formed in the circular adjoining faces of cap 108 and brake engagement structure 43. Thus, shear pin 114 imparts the rotation of the cap to the brake engagement structure. Alternatively, a plurality of shear pins may be used to rotationally couple the brake engagement structure to the cap. As a further alternative, other types of releasable coupling elements may be used.

As is well known to those of skill in the art, shear pin 114 is a torque-limiting coupling device that will shear off, or release, at a predetermined shearing force proportional to the torque between the brake engagement structure and the cap. The amount of torque required to shear the shear pin will vary depending on the configuration of the shear pin (i.e., size, shape, material, hardness, etc.). Typically, the configuration of shear pin 114 is selected to ensure shearing only in response to a threshold torque corresponding to the engagement of a brake pawl or other braking component with the brake engagement structure. Thus, shear pin 114 will not shear under normal operating conditions. However, once the brake pawl engages the brake engagement structure, shear pin 114 will shear, thereby releasing brake engagement structure 43 to rotate freely about cap 108. This releases the rotational coupling between the router bit and the motor assembly and spindle so that the rotation of the router bit can be stopped without stopping the motor and spindle.

Figure 4:
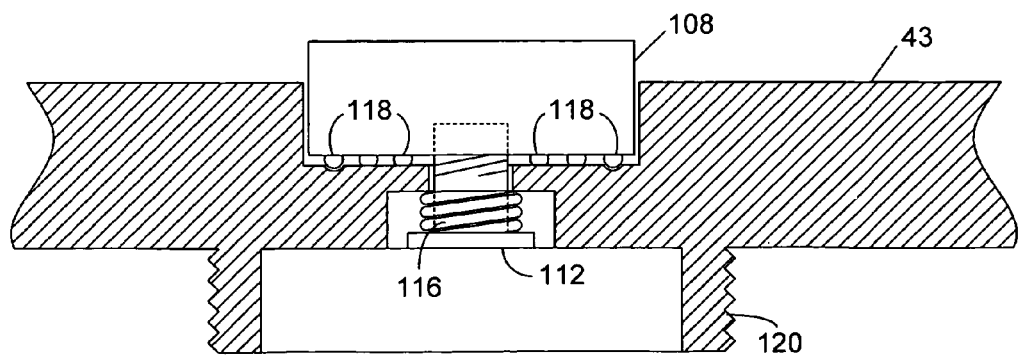
FIG. 4 is a close-up schematic side elevation of an alternative releasable coupling mechanism.

While shear pin 114 has been described above as one example of a releasable, rotational coupling between the router bit and the spindle or motor, it will be appreciated that any of a variety of alternative mechanisms may be used. As another example, brake engagement structure 43 and router bit 98 may be coupled to spindle 42 by a releasable coupling that automatically re-couples the router bit to the spindle once the torque load decreases to a predetermined level. One example of such a coupling is illustrated in FIG. 4. As shown, brake engagement structure 43 is coupled to cap 108 by a spring-loaded, torque-limiting coupling assembly. The shank of bolt 112 passes through brake engagement structure 43 to threadedly engage cap 108. A compression spring 116 is disposed around the shank of the bolt between the brake engagement structure and the head of the bolt. Spring 116 urges the brake engagement structure and cap tightly together. A plurality of ball bearings 118 are disposed between the cap and brake engagement structure, and normally sit in recesses in the surfaces of the cap and brake engagement structure. Alternatively, the cap and/or the brake engagement structure may have one or more circular tracks of alternating ridges and depressions which the ball bearings may be seated in.

During normal operation, the brake engagement structure is rotationally coupled to the cap by ball bearings 118, which are held in the recesses by the compressive force exerted by spring 116. However, upon application of sufficient torque, ball bearings 118 will roll out of the recesses, allowing the brake engagement structure to rotate relative to the cap. The amount of torque necessary to unseat the ball bearings (the "decoupling-torque threshold") will depend on the compressive force exerted by spring 116. Thus, spring 116 may be selected to yield a desired decoupling-torque threshold. Optionally, suitable alignment structure (not shown) may be disposed between the brake engagement structure and cap to maintain the ball bearings in a concentric path about bolt 112. In such case, the ball bearings would continually roll into and out of the recesses until the applied torque decreased below a threshold level, at which point the ball bearings would reseat into the recesses, thereby re-coupling the brake engagement structure to the cap. It will be appreciated that the torque threshold level at which the ball bearings will be unseated may be the same as, or different than, the torque threshold level at which the unseated ball bearings will be reseated. While the exemplary releasable coupling depicted in FIG. 3 may be less expensive to manufacture, the exemplary coupling depicted in FIG. 4 has the advantage of not requiring replacement of a shear component to return the router to normal operation after the brake mechanism has been triggered to stop the router bit.

The exemplary coupling depicted in FIG. 4 is a relatively simple version of a variety of torque-limiting couplers known in the art. Any of these couplers may be used to releasably couple the router bit to the spindle and motor assembly. A few examples of the many such suitable couplers, showing just a few of the possible configurations, are described in the following U.S. patents, the disclosures of which are herein incorporated by reference: U.S. Pat. No. 4,898,249 to Ohmori, U.S. Pat. No. 5,738,469 to Hsu, U.S. Pat. No. 5,277,527 to Yokota, and U.S. Pat. No. 6,045,303 to Chung. Additionally, any other suitable torque-limiting coupler such as are known in the art may be used.

Returning attention to FIG. 3, chuck 110 is axially and rotationally coupled to brake engagement structure 43 by any suitable coupler mechanism. In the exemplary implementation, chuck 110 and brake engagement structure 43 are formed as an integral, unitary assembly. This ensures that the chuck and router bit remain securely coupled to the brake engagement structure during braking. Alternatively, chuck 110 may be coupled to brake engagement structure 43 by any known mechanism adapted to securely hold the chuck and brake engagement structure together during both operation and braking. For example, the exemplary brake engagement structure depicted in FIG. 4 includes an externally threaded ring 120 adapted to engage a matching threaded bore on chuck 110. Optionally, the threaded bore on the chuck may be a different size than the threaded end of spindle 42 to prevent an operator from inadvertently attaching the chuck to the spindle without the brake engagement structure. Alternatively, ring 120 may be internally threaded to receive a matching threaded post (not shown) on chuck 110. As will be described in more detail below, either chuck 110 or brake engagement structure 43 may include a locking mechanism to prevent inadvertent loosening during operation or braking.

Chuck 110 may be any suitable router chuck configured to securely hold router bit 98 during both normal operation and during braking. In the exemplary implementation, chuck 110 is a quick-release router chuck such as is available from Jacobs of Clemson, S.C. under the designation HAND-TITE, POWERCOLLET, router chuck. Other suitable chucks are described in the following U.S. patents, the disclosures of which are herein incorporated by reference: U.S. Pat. No. 5,755,448 to Kanaan et al., U.S. Pat. No. 5,820,136 to Han et al., U.S. Pat. No. 5,921,563 to Huggins et al., and U.S. Pat. No. 5,947,484 to Huggins et al.

Figure 5:
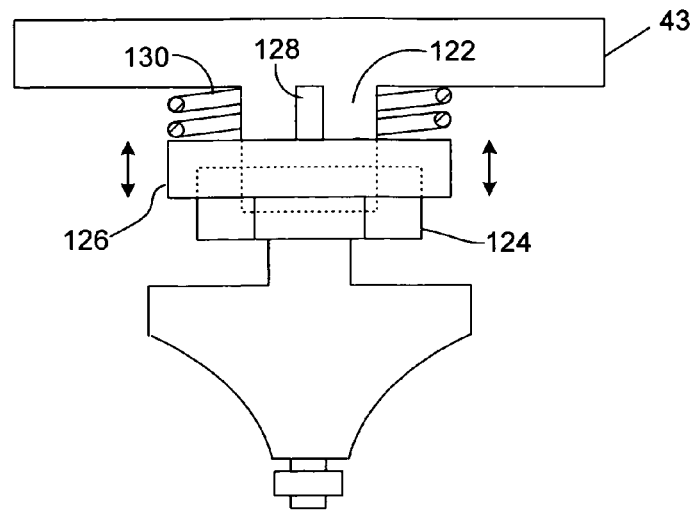
FIG. 5 is a close-up schematic side elevation of another alternative releasable coupling mechanism.

FIG. 5 illustrates an alternative mechanism for coupling router bit 98 to brake engagement structure 43. As shown, brake engagement structure 43 is formed to define a collet 122 adapted to receive router bit 98. A collet nut 124 threadedly engages the outer surface of collet 122 to tighten the collet around the router bit as is well known in the art. However, depending on the direction of the threads on collet 122, collet nut 124 may tend to self-loosen either during normal operation or during braking. Therefore, the coupling mechanism also includes a spring-loaded locking member 126 disposed around the collet, and adapted to extend at least partially around the sides of collet nut 124. The locking member includes a projecting key (not shown) adapted to slide along an axial channel 128 in collet 122. Thus, the locking member is rotationally fixed to the collet. A compression spring 130 is positioned around the collet between the brake engagement structure and the locking member to bias the member toward collet nut 124. Locking member 126 includes an internal bore shaped to correspond to, and fit around, the external shape of the nut (e.g., hexagonal, octagonal, etc.). As a result, when locking member 126 is slid over collet nut 124, the collet nut is prevented from rotating relative to brake engagement structure 43. The locking member may be pressed away from the collet nut against the bias of spring 130 to tighten or loosen the collet nut on the collet. Alternatively, it will be appreciated that a variety of other locking mechanisms may be used to prevent collet nut 124 from self-loosening about collet 122.

As described above and in the incorporated references, safety system 18 includes a detection subsystem configured to detect one or more dangerous conditions such as contact between a person and the router bit, hazardous proximity of a person to the router bit, etc. Typically, router bit 98 is electrically insulated from motor assembly 16 and housing 84. It will be appreciated that the router bit may be electrically insulated in any of a variety of different ways. Various exemplary configurations and mechanisms for electrically insulating the cutting tool from the remainder of the machine are described in the incorporated references. As any of these configurations and mechanisms may be adapted for use with router 10, additional description will not be provided here. Likewise, various suitable configurations and mechanisms for monitoring the router bit and detecting contact, proximity, etc., are described in the incorporated references and, therefore, will not be described further herein. It will be understood that safety system 18 may incorporate any one or combination of the various alternative embodiments described in the references incorporated above.

Returning attention to FIG. 3, safety system 18 also includes a reaction subsystem 24 configured to stop the rotation of the router bit in the event the dangerous condition is detected. The reaction subsystem may be configured in any of a number of different ways. A variety of different exemplary reaction subsystems are described in the references incorporated herein, and may be adapted for use with router 10. Alternatively, FIG. 3 illustrates another exemplary embodiment in which reaction subsystem 24 includes at least one brake mechanism 28 having a brake pawl adapted to engage the brake engagement structure and stop the rotation of the brake engagement structure and router bit. While exemplary reaction subsystem 24 is described as having a single brake mechanism, it will be appreciated that the reaction subsystem may alternatively have a plurality of similar or different brake mechanisms as illustrated in FIG. 3.

Exemplary brake mechanism 28 includes a brake pawl 60 adapted to engage brake engagement structure 43 and stop the rotation of the brake engagement structure. Brake pawl 60 is biased to move into contact with and engage brake engagement structure 43 by a suitable biasing mechanism such as spring 66. The brake pawl is held spaced-apart from the brake engagement structure by a suitable restraining mechanism, such as a fusible member (not shown). A suitable release mechanism, such as a firing subsystem (not shown) is adapted to release the brake pawl from the restraining mechanism to move into contact with the brake engagement structure under the urging of spring 66. A variety of different exemplary brake mechanisms, biasing mechanisms, restraining mechanisms, and release mechanisms are described in the references incorporated herein. In addition, alternative actuators suitable for moving brake pawl 60 into contact with brake engagement structure 43 are described in U.S. Provisional Patent Application Ser. No. 60/302,916, filed Jul. 3, 2001, the disclosure of which is herein incorporated by reference.

Brake pawl 60 is positioned adjacent the brake engagement structure to engage the edge of the brake engagement structure. In the exemplary embodiment, brake pawl 60 is mounted in a replaceable cartridge 80. A variety of alternative embodiments of cartridge 80 are described in the incorporated references. The cartridge is removably coupled to housing 84 to support the cartridge and brake pawl during braking. A portion 132 of cartridge 80 may be adapted to be received into a matching receptacle or socket in housing 84 to support the cartridge and electrically couple the cartridge to detection subsystem 22 and/or control subsystem 26. Control subsystem 26 may be configured to prevent operation of the router unless cartridge 80 is properly received in the socket. The cartridge is sized to ensure the brake pawl is aligned with the brake engagement structure when the cartridge is received in the socket. Optionally, safety system 18 may include a spacing detection system adapted to determine whether the brake pawl is at an acceptable spacing from the brake engagement structure, and to prevent operation of the router unless the brake pawl is properly spaced from the brake engagement structure.

Figure 6:
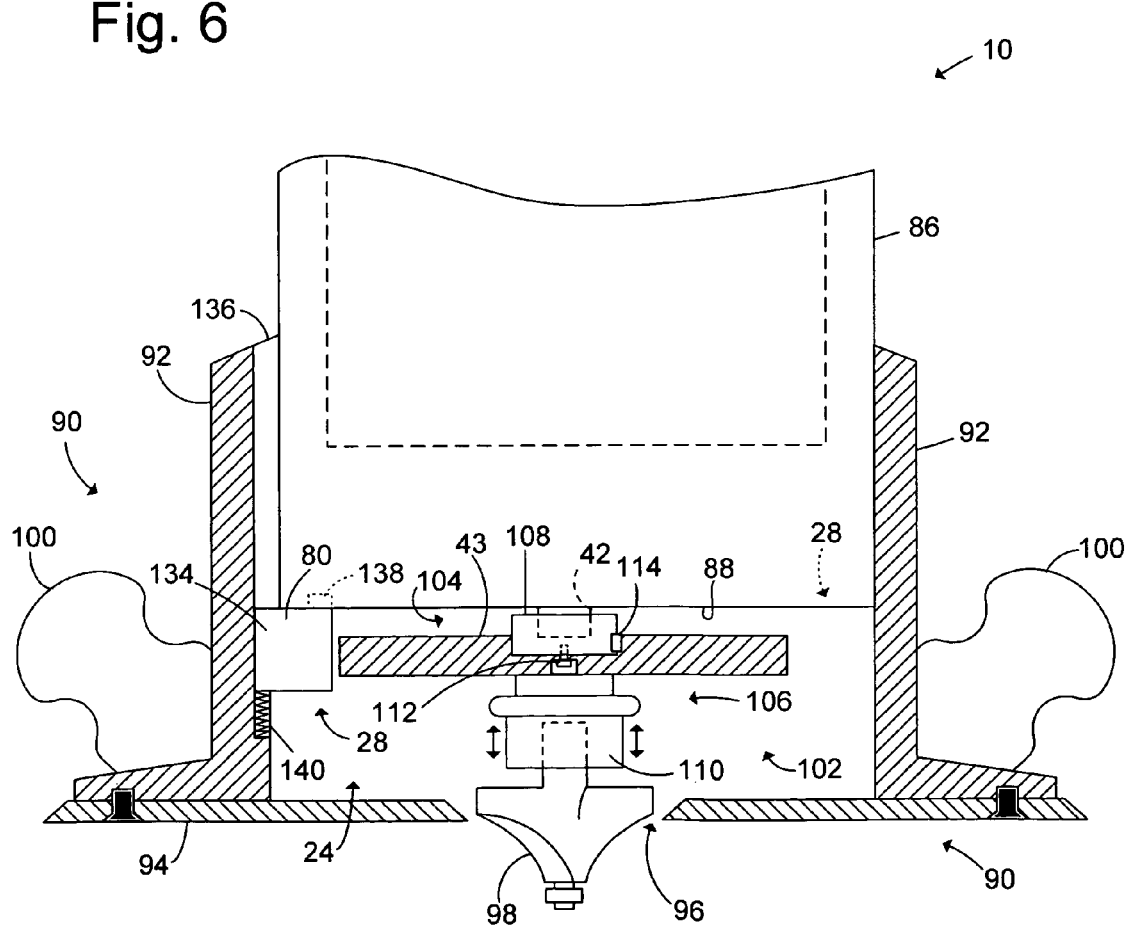
FIG. 6 is a schematic side elevation and partial cross-sectional view of a router with an alternative safety system according to the present invention.

Alternatively, cartridge 80 may be coupled to base assembly 90 instead of, or in addition to, housing 84. For example, in the exemplary embodiment illustrated in FIG. 6, a portion 134 of the cartridge is adapted to be received within a channel 136 of shell 92. The base assembly holds the cartridge securely during normal operation and braking. A portion 138 of the cartridge may be adapted to engage a matching receptacle or socket in the router to electrically couple the cartridge to the detection subsystem and/or control subsystem. A biasing mechanism such as a spring 140 may be disposed in channel 136 to hold the cartridge against lower end 88 as the axial position of the base assembly is adjusted relative to housing 84. It will be appreciated that cartridge 80 may be coupled to the router housing and/or the base assembly by any other suitable coupling mechanism such as screws, clips, etc.

In some embodiments of safety system 18, brake pawl 60 and/or another component of the reaction subsystem may be a single-use component. Thus, in the event the brake mechanism is actuated to stop the router bit, the used cartridge is removed and a new cartridge is installed to place the router back in service. Alternatively, the single-use component within the cartridge may be replaced and the cartridge reinstalled. Brake engagement structure 43 may be either a single-use component or it may be reusable one or more times.

In the embodiments depicted in FIGS. 3-6, brake engagement structure 43 is positioned externally to housing 84. However, it will be appreciated that the brake engagement structure may alternatively be positioned within the housing. For example, FIG. 7 illustrates an embodiment in which brake engagement structure 43 is positioned within housing 84 adjacent lower end 88. One advantage of this configuration is that the rotating brake engagement structure and the brake pawl are not exposed outside of housing 84.

As shown in FIG. 7, brake engagement structure 43 is coupled to spindle 42 at a point inside housing 84 by a releasable coupling 142. The releasable coupling may be any suitable releasable coupling such as the torque-limiting couplings described above, or other releasable couplings known in the art. Alternatively, spindle 42 may include a torque-limiting mechanism adapted to uncouple a portion of the spindle proximate the brake engagement structure from the remainder of the spindle and motor assembly. As a further alternative, brake engagement structure 43 may be rigidly coupled to the spindle and brake mechanism 28 may be configured to stop the rotation of the spindle and motor armature. In the latter case, brake engagement structure 43 may be positioned at any point on spindle 42 including the opposite end of router 10 or a position between the opposing ends.

In any event, brake pawl 60 is configured to engage brake engagement structure 43 within housing 84. In the exemplary embodiment, cartridge 80 is adapted to be received into a matching socket or receptacle in housing 84 to position the brake pawl adjacent the edge of the brake engagement structure. Thus, the cartridge is securely supported by the housing and electrically coupled to the detection subsystem and/or the control subsystem. Optionally, the cartridge may be shaped to match the shape and contours of housing 84, thereby forming a portion of the exterior surface of the router housing when properly installed. Preferably, though not necessarily, the cartridge is configured to extend flush with, or behind, lower end 88 of housing 84 to allow the router to be mounted to a workpiece support surface (e.g., router table, etc.) without interference.

A portion 144 of brake engagement structure 43 extends through a hole in lower end 88 to couple to router chuck 110. Alternatively, a portion of the router chuck may extend through lower end 88 into housing 84 to couple to the brake engagement structure. In any event, chuck 110 is axially and rotationally coupled to the brake engagement structure to securely hold the router bit during both operation and braking. Chuck 110 may be coupled to brake engagement structure 43 by any suitable coupling mechanism such as described above. Similarly, chuck 110 may be any suitable router bit chuck or collet such as described above.

Optionally, brake engagement structure 43 may be configured to force air backward into housing 84, thereby eliminating the need (if any) for a separate air-cooling fan. For example, in the exemplary embodiment depicted in FIG. 7, brake engagement structure 43 includes one or more airflow channels 146 adapted to push air into housing 84 when the brake engagement structure is rotating. Thus, brake engagement structure 43 functions as the cooling fan for motor assembly 16 (i.e., the cooling fan is the brake engagement structure). It will be appreciated that airflow channels 146 may be sized and shaped as needed to achieve a desired airflow. In the depicted embodiment, airflow channels 146 are disposed inside the outer perimeter of brake engagement structure 43. However, it will be appreciated that the airflow channels may alternatively extend out to the perimeter of the brake engagement structure. Typically, airflow channels 146 will be configured and arranged to maintain the brake engagement structure in a balanced condition for smooth rotation.

As described above, brake mechanism 28 includes one or more braking components adapted to engage and stop brake engagement structure 43 and router bit 98. It will be appreciated that the particular configuration of the braking component will vary depending on the configuration of the brake engagement structure, and that various combinations of the braking component and brake engagement structure may be used. Typically, the braking component and the brake engagement structure are configured to ensure the brake mechanism stops the rotation of the brake engagement structure and router bit within a desired time period ("braking time") after the dangerous condition is detected. The desired braking time may vary depending on the type of dangerous condition detected. For example, if the dangerous condition is contact between a person and the router bit, then a relatively short braking time is usually desirable to minimize any injury to the person. However, if the dangerous condition is proximity between the person and the router bit, then a somewhat longer braking time may be sufficient to prevent or minimize injury. Where contact is the dangerous condition detected, the brake engagement structure and braking component are preferably configured to achieve a braking time of approximately 10-milliseconds, and more preferably approximately 5-milliseconds. Where proximity is the dangerous condition being detected, the preferred braking time will depend on the distance between the person and the router bit at which proximity is detected. For instance, if proximity is detected when a part of the person's body is ⅛-inch from the router bit, then the braking time may be longer than if proximity is detected at a spacing of 1/32-inch.

In some embodiments brake pawl 60 and/or brake engagement structure 43 may include structure adapted to increase the grip or binding of the brake pawl and brake engagement structure. For example, the references incorporated herein describe many different alternative configurations of brake pawl 60 which may be suitable for engaging and stopping brake engagement structure 43. Many of the brake pawl configurations described in those references are adapted to engage and bind against a circular blade having a plurality of teeth disposed around the perimeter of the blade. The blade is usually constructed of a metal such as steel, while the brake pawl is constructed of a softer material which allows the teeth to cut into and wedge onto the brake pawl. Typical brake pawl materials include relatively high strength thermoplastics such as polycarbonate, ultrahigh molecular weight polyethylene (UHMW) or Acrylonitrile Butadiene Styrene (ABS), etc., or metals such as aluminum, etc. It will be understood that the term "brake pawl" is used herein generically to mean a braking component of any size, shape or configuration.

In the exemplary embodiment, depicted in FIG. 8, brake engagement structure 43 includes a plurality of gripping elements 148, which are similar to saw teeth. The brake pawl is biased by spring 66 to pivot into contact with the edge of the brake engagement structure so that gripping elements 148 engage the brake pawl. The brake engagement structure is constructed of a material having a greater hardness than the material of the brake pawl so that the gripping elements at least partially "bite" into brake pawl 60. Constructing the brake engagement structure from a material that is relatively durable and harder than the brake pawl material ensures that the brake engagement structure usually will not be damaged during braking. The exemplary brake pawl is sized and configured to ensure that the brake pawl does not pivot past the brake engagement structure without binding against the brake engagement structure and stopping its rotation.

Figure 10:
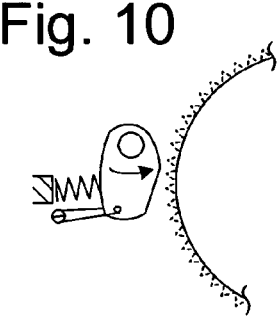
FIG. 10 is a partial schematic view showing another alternative brake pawl and brake engagement structure.

While one particular brake pawl shape is depicted, many different variations and modifications may be used. Additionally, it will be appreciated that the exact size and shape of gripping elements 148 is not critical, but instead may vary with the particular brake pawl. FIGS. 9 and 10 show just a few examples of alternative brake pawl shapes adapted to grip the brake engagement structure. The exemplary brake pawl depicted in FIG. 9 is shaped to generally conform to the perimeter of the brake engagement structure, thereby providing greater contact area between the brake pawl and brake engagement structure. The exemplary brake pawl depicted in FIG. 10 is shaped to form a cam wedge relative to the brake engagement structure to quickly bind against the brake engagement structure. Additionally, the alternative brake pawls described in the incorporated references may also be used to stop the rotation of the toothed brake engagement structure depicted in FIG. 8.

Figure 11:
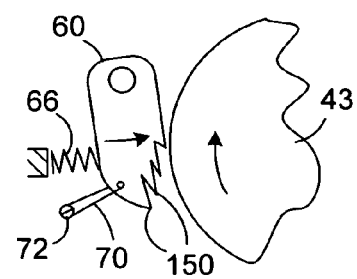
FIG. 11 is a partial schematic view showing another alternative brake pawl and brake engagement structure.

While the brake engagement structure described above is adapted to bite into the brake pawl, safety system 18 may alternatively be configured so that the brake component bites into the brake engagement structure to increase the binding action between the brake pawl and brake engagement structure. For example, FIG. 11 illustrates an embodiment in which brake pawl 60 includes one or more gripping elements 150 adapted to bite into brake engagement structure 43. In this embodiment, the brake pawl typically is constructed of a material having a greater hardness than the material of the brake engagement structure. For example, the brake pawl may be constructed of steel to engage a plastic or aluminum brake engagement structure, etc.

Figure 12:
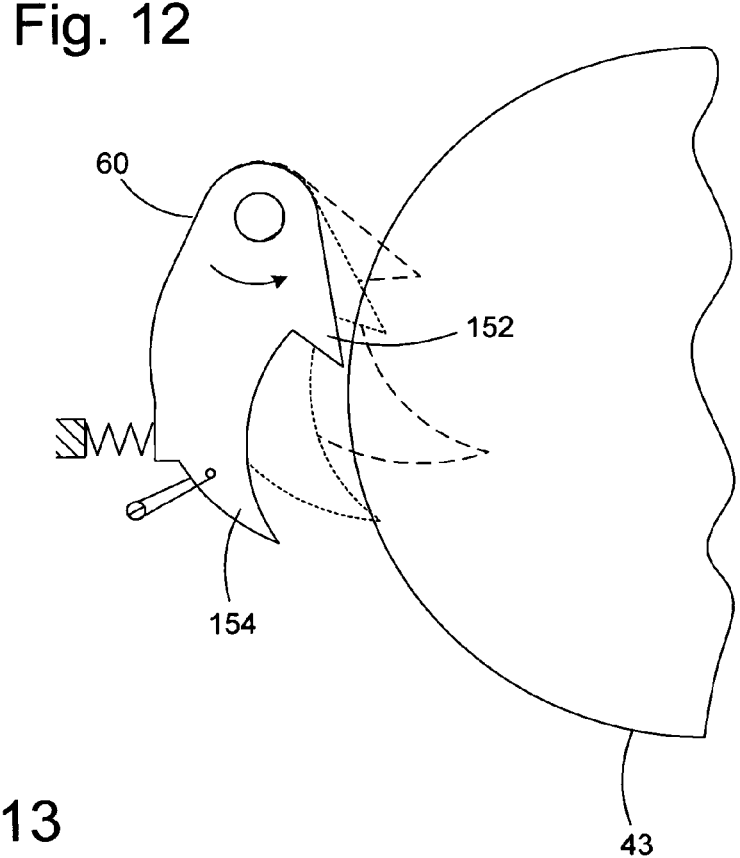
FIG. 12 is a partial schematic view showing another alternative brake pawl and brake engagement structure.

FIG. 12 illustrates another alternative embodiment in which brake pawl 60 includes at least one latching element 152 and at least one binding element 154. Latching element 152 is adapted to quickly contact and latch on to the rotating brake engagement structure, thereby imparting the energy of the brake engagement structure to the brake pawl. The speed and energy of the brake engagement structure is transferred to the brake pawl, causing the brake pawl to quickly pivot further into contact with the edge of the brake engagement structure. Thus, as illustrated in FIG. 12, the latching element ensures that the binding element is driven into the edge of the brake engagement structure to wedge in the brake engagement structure and quickly stop its rotation. While the edge of the brake engagement structure is illustrated as being smooth, it will be appreciated that the edge of the brake engagement structure may alternatively include gripping structure such as ridges, etc., adapted to prevent latching element 152 or binding element 154 from sliding around the edge of the brake engagement structure.

Figure 13:
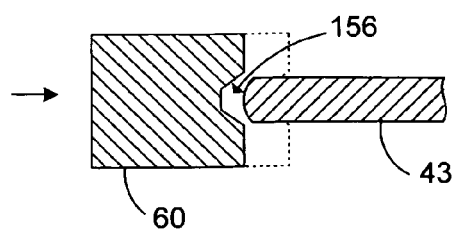
FIG. 13 is a partial schematic view showing another alternative brake pawl and brake engagement structure.

Brake pawl 60 and/or brake engagement structure 43 may also be shaped to increase the gripping action between the components instead of, or in addition to, other grip-enhancing structures. For example, FIG. 13 shows a cross-sectional view of an alternative brake engagement structure shaped to wedge within a channel 156 formed in the contacting surface of the brake pawl. As can be seen, channel 156 is tapered to a width that is less than the width of the brake engagement structure so that the upper and lower surfaces of the brake engagement structure will wedge against the upper and lower surfaces of the channel. It will be appreciated that channel 156 may be plural channels and/or may have any of a variety of shapes to match corresponding brake engagement structures. Alternatively, the brake pawl may be shaped to wedge within one or more channels formed in the brake engagement structure.

As described above and in the incorporated references, reaction subsystem 24 may be adapted to retract a cutting tool away from its operating position (and therefore the user) upon the detection of a dangerous condition. The reaction subsystem may be configured to retract the cutting tool in addition to, or instead of, stopping the movement of the cutting tool. Thus, the reaction subsystem may be configured to retract router bit 98 at least partially away from its operating position upon detection of a dangerous condition such as accidental contact between a user and the router bit. Optionally, the reaction subsystem may be configured also to quickly stop the movement of the router bit simultaneous, or substantially simultaneous, with retracting the router bit.

Figure 14:
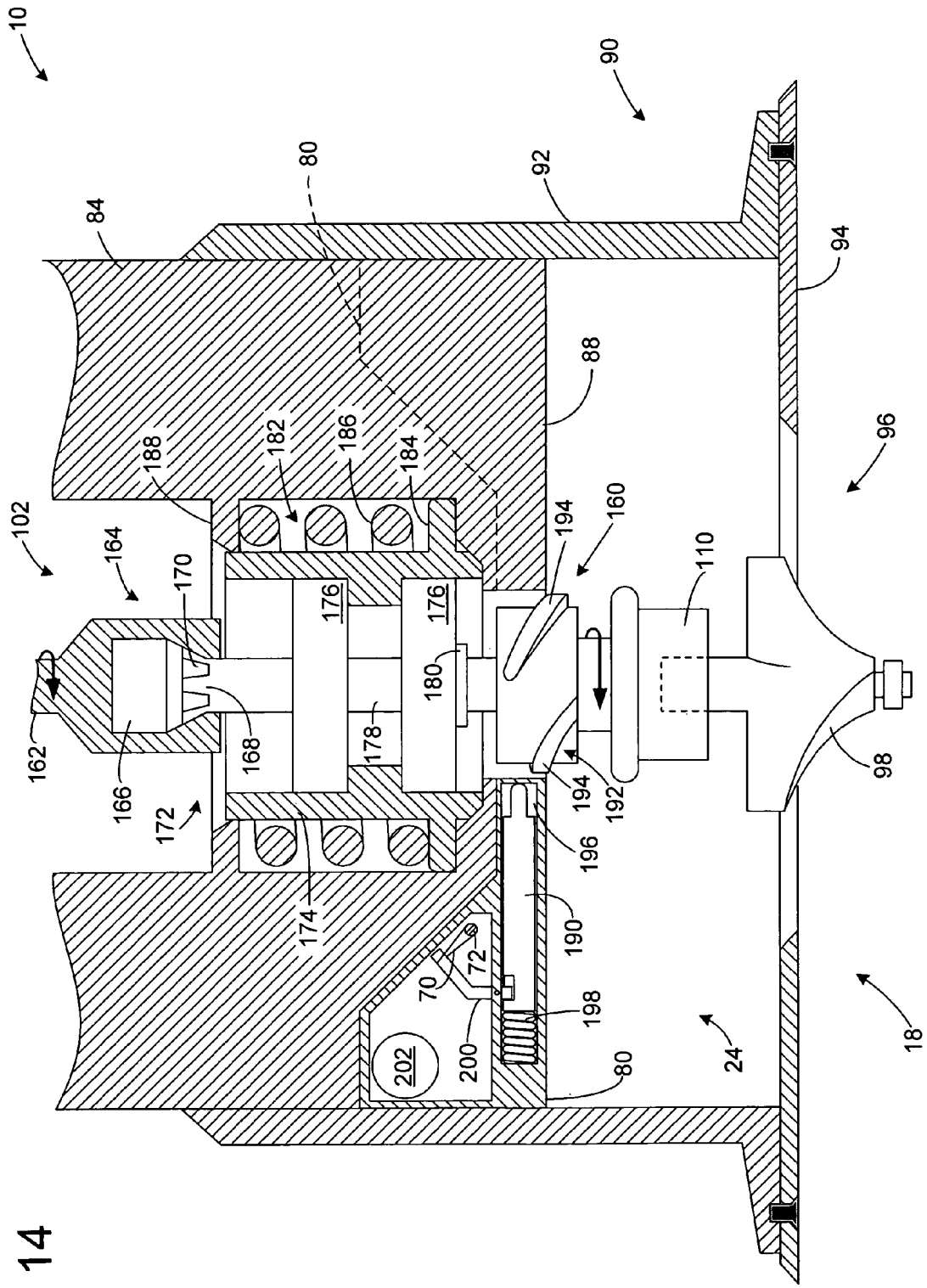
FIG. 14 is a schematic side elevation and partial cross-sectional view of a router with an alternative safety system according to the present invention.
Figure 15:
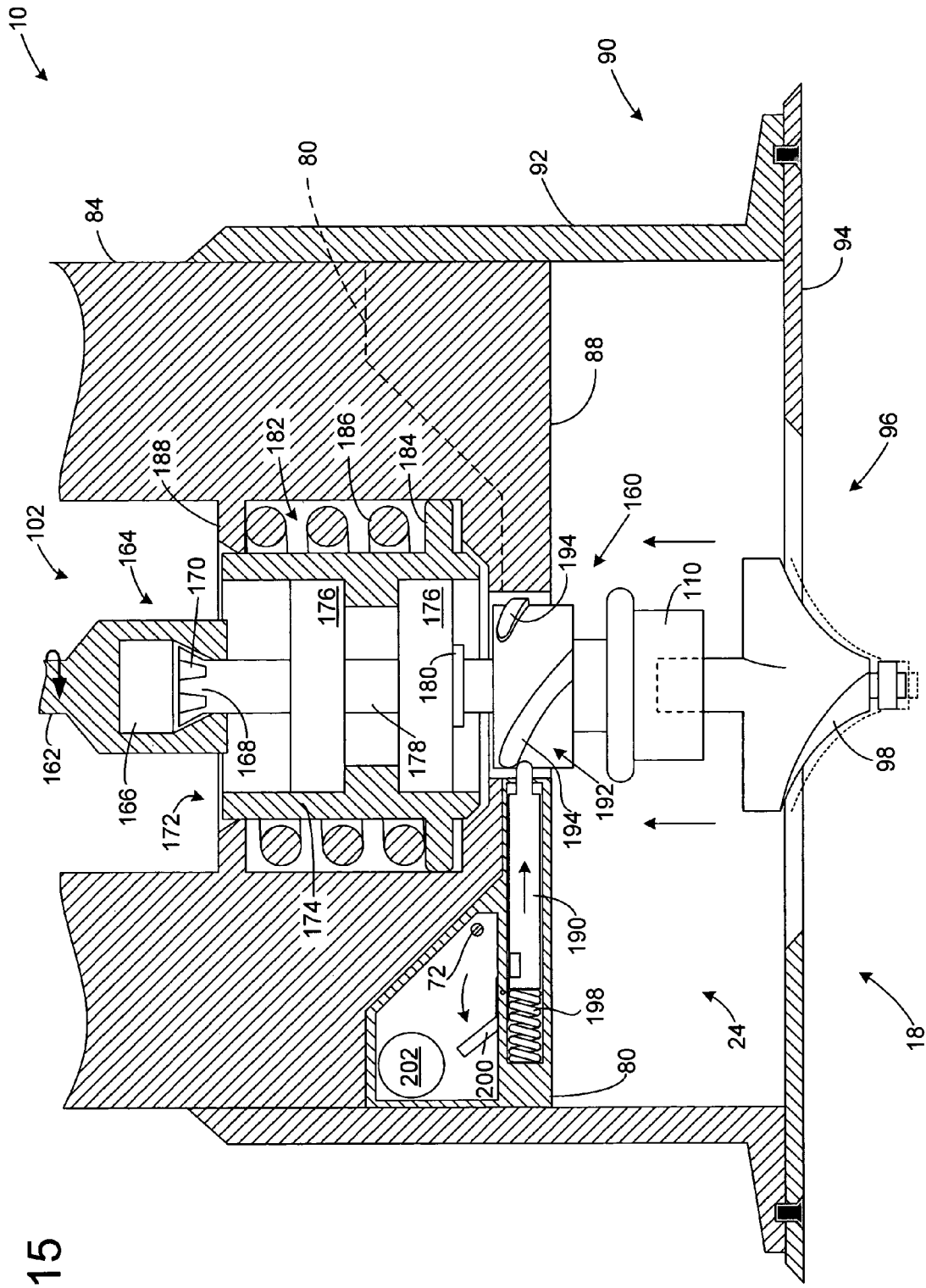
FIG. 15 is a schematic side elevation and partial cross-sectional view of the router of FIG. 14 in which the spindle assembly has begun to retract.
Figure 16:
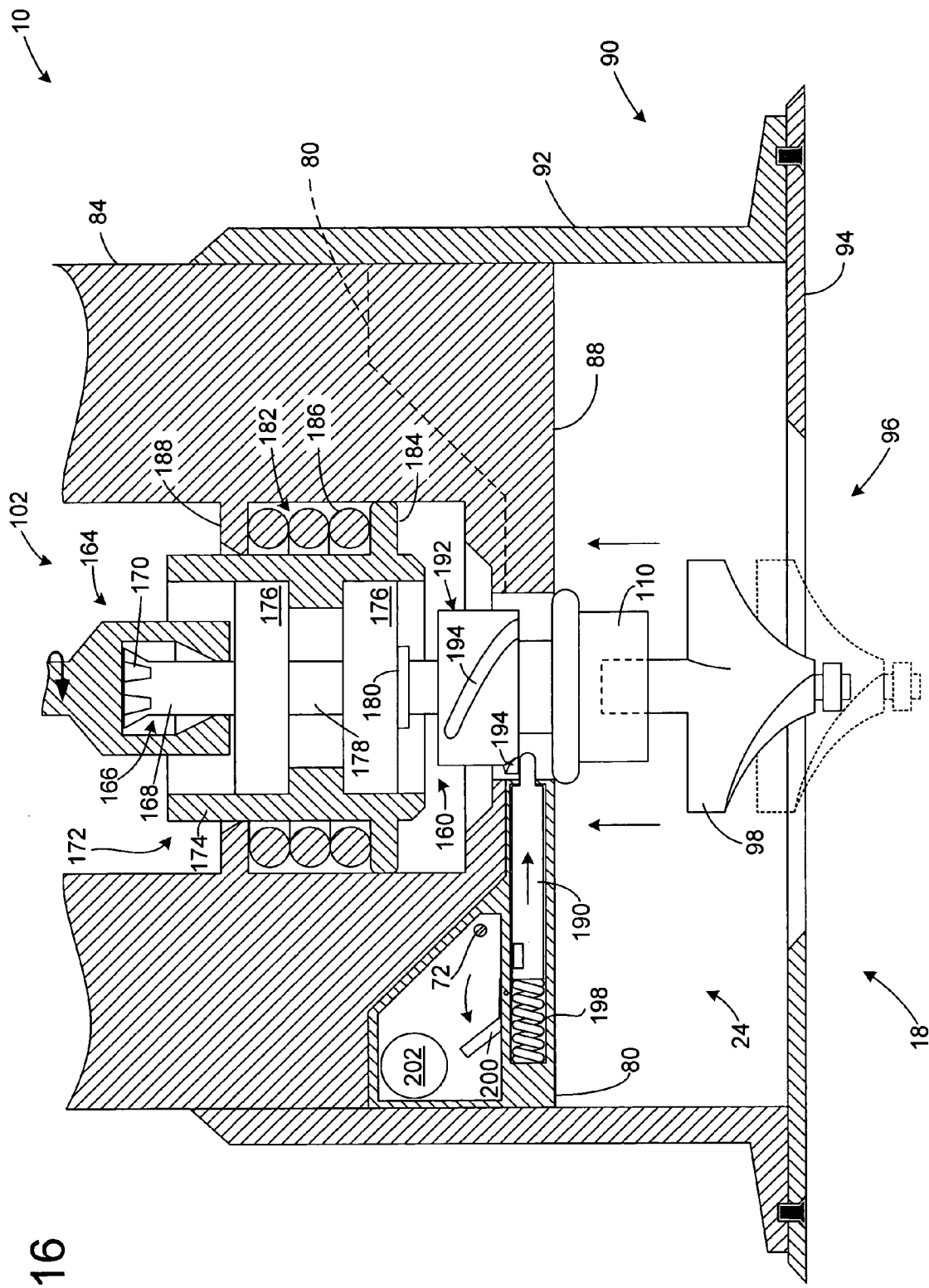
FIG. 16 is a schematic side elevation and partial cross-sectional view of the router of FIG. 14 in which the spindle assembly has fully retracted.

It will be appreciated that reaction subsystem 24 may be configured in any of a variety of different ways to at least partially retract the router bit from its fully-extended or operative position. As one example, FIGS. 14-16 illustrate an exemplary embodiment of router 10 and safety system 18 in which the router bit is retracted at least partially toward housing 84. As shown, router bit 98 is axially and rotationally coupled to a retractable spindle assembly 160 by a chuck 110 or other suitable coupling mechanism. Retractable spindle assembly 160 is coupled to a shaft 162 that forms part of the motor armature (not shown) by a coupling mechanism 164 adapted to allow the spindle assembly to move axially relative to housing 84. In the exemplary embodiment, coupling mechanism 164 is integral with shaft 162 to form the end of the shaft proximate spindle assembly 160. Coupling mechanism 164 defines a hollow, cylindrical chamber 166 with a tapered end. The end 168 of spindle assembly 160 proximate the coupling mechanism is disposed within chamber 166 and outwardly tapered to conform to the tapered end of the chamber. A portion of the coupling mechanism may be removably connected (e.g., by screws, clips, etc.) from the remainder of the coupling mechanism to facilitate installation of end 168 within chamber 166. Alternatively, chamber 166 may be formed on the end of spindle assembly 160 to receive the end of shaft 162. As a further alternative, chamber 166 may be replaced by a separate sleeve or other coupler adapted to rotationally connect the end of shaft 162 to end 168 of the spindle assembly.

In the exemplary embodiment, the tapered end of chamber 166 and spindle end 168 are formed with complementary gripping structures 170 such as flutes, teeth or grooves so that rotation of shaft 162 is translated to spindle assembly 160 by flutes 170. Alternatively, chamber 166 and end 168 may be formed with other rotational gripping structure. In addition, while chamber 166 and end 168 are illustrated as having generally conically-tapered shapes, other shapes may alternatively be used such as round, etc. In any event, exemplary coupling mechanism 164 is configured to rotationally couple spindle assembly 160 to shaft 162 when end 168 is seated within the tapered end of chamber 166. However, end 168 is axially movable within chamber 166 as illustrated in FIGS. 15 and 16. When spindle assembly 160 retracts, flutes 170 on chamber 166 and end 168 disengage, thereby releasing the rotational coupling between the spindle assembly and shaft 162. Alternatively, chamber 166 and end 168 may be shaped to maintain a rotational coupling as the spindle assembly slides axially relative to the shaft.

Retractable spindle assembly 160 is supported within housing 84 by a retractable bearing assembly 172 configured to slide axially within the housing. Retractable bearing assembly 172 includes a collar 174 adapted to receive a pair of bearings 176. The bearings are seated within a hollow central bore of collar 174 and maintained in substantially parallel alignment to receive and rotationally support the central portion 178 of spindle assembly 160. Central portion 178 may include one or more integral or removable clips or shoulder structures 180 adapted to prevent the spindle assembly from sliding out of position within bearings 176.

Retractable bearing assembly 172 is slidably received within a central bore 182 of housing 84. The exterior corner of collar 174 adjacent housing lower end 88 and the interior corner of bore 182 are tapered so that the collar is self-seating and self-aligning within the central bore when the collar is in its unretracted position as shown in FIG. 14. A guide ring 184 extends outward from collar 174 to contact and slide against the interior wall of central bore 182. Guide ring 184 maintains collar 174 and spindle assembly 160 centrally aligned within housing 84 as the collar and spindle assembly move axially relative to the housing.

Retractable bearing assembly 172 also includes a biasing mechanism 186 configured to urge collar 174 toward lower end 88 of housing 84. In the exemplary embodiment, biasing mechanism 186 takes the form of a spiral compression spring sized to fit around the outer surface of collar 174. Spring 186 is compressed between guide ring 184 and a support structure 188 that extends from central bore 182. In the exemplary embodiment, support structure 188 takes the form of a rigid ring within a central aperture sized to fit around collar 174 while retaining spring 184. Alternatively, support structure 188 may take any other form including, for example, spring-loaded structures which may be retracted at least partially within the walls of central bore 182.

During normal operation of router 10, spring 186 maintains collar 174 and spindle assembly 160 in its nominal or fully extended position shown in FIG. 14. However, upon application of an axial force on spindle assembly 160 that is greater than, and opposite to, the force exerted by spring 186 (i.e., a retracting force), the collar and spindle assembly will retract at least partially into housing 84 as can be seen in FIGS. 15 and 16. The amount of retraction will be determined by the relative sizes and configurations of retractable spindle assembly 160, retractable bearing assembly 172, and coupling mechanism 164. In some embodiments, it may be desirable to retract router bit 98, or at least the cutting portion of the router bit, above support plate 94. Where router 10 is mounted to the underside of a router table, it may be desirable to retract the router bit below the table. In any event, once the retracting force is removed from the spindle assembly, the urging of spring 186 moves collar 174 and spindle assembly 160 back toward the fully extended position. While one exemplary configuration of retractable bearing assembly 172 has been described above, it will be appreciated by those of skill in the art that many variations, modifications and alternative configurations may be used.

In response to detection of a dangerous condition by the detection subsystem, reaction subsystem 24 is configured to cause a retracting force to be applied to retractable spindle assembly 160. In the exemplary embodiments depicted in FIGS. 14-17, the reaction subsystem is configured to engage the spindle assembly and utilize the rotational energy of the spindle assembly to create a retracting force on the spindle assembly. However, it will be appreciated by those of skill in the art that reaction subsystem 24 may be configured to cause the retracting force in any of a variety of different ways and that the depicted embodiments are just a few examples of the many suitable configurations of reaction subsystem 24.

Figure 17:
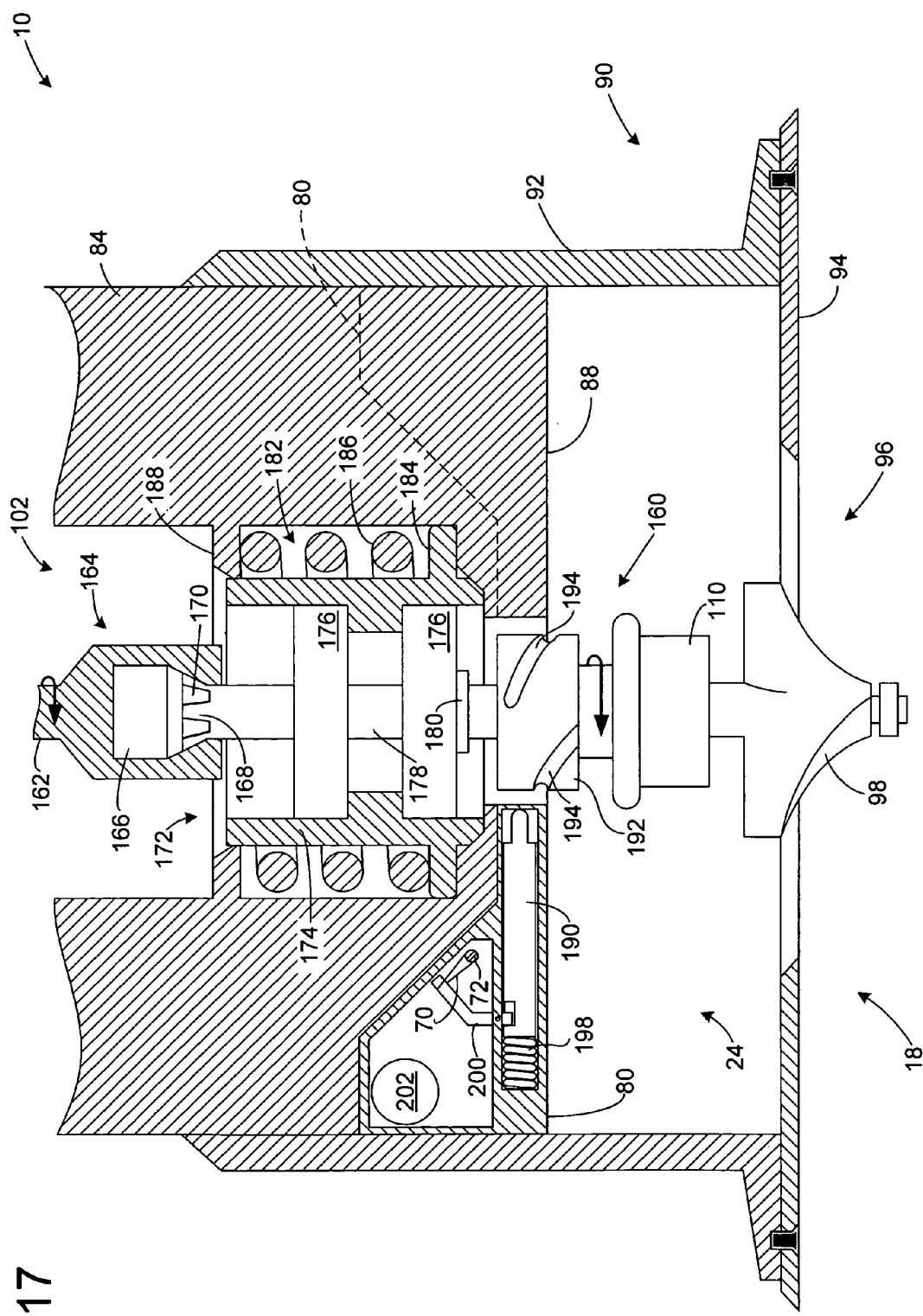
FIG. 17 is a schematic side elevation and partial cross-sectional view of a router with another alternative safety system according to the present invention.
Figure 18:
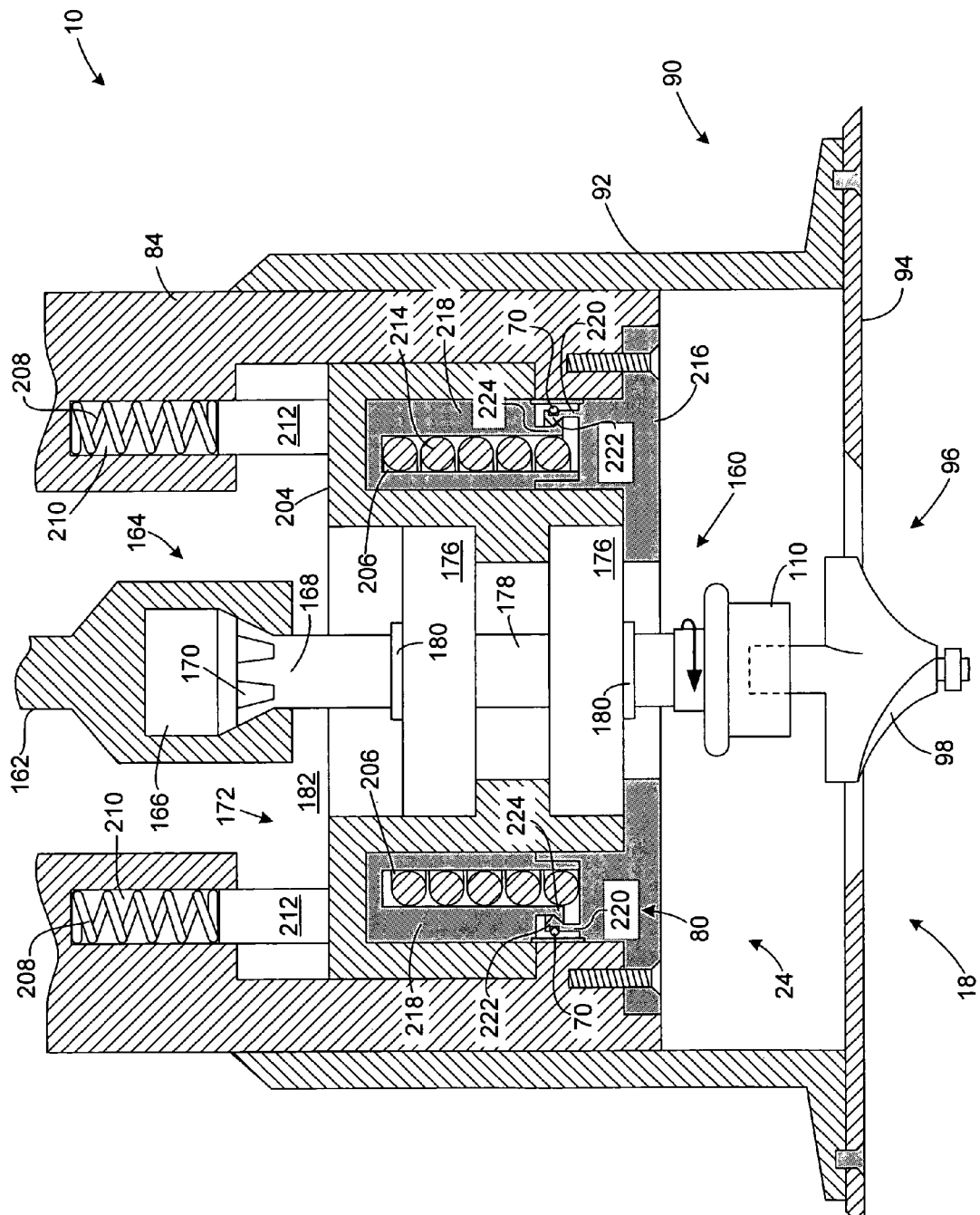
FIG. 18 is a schematic side elevation and partial cross-sectional view of a router with another alternative safety system according to the present invention.

Exemplary reaction subsystem 24 includes a spindle engagement member 190 adapted to engage a portion of spindle assembly 160 and urge the spindle assembly to retract. Although not required, exemplary spindle engagement member 190 is mounted in a removable cartridge 80 attached to router housing 84 and/or base assembly 90. Retractable spindle assembly 160 includes an engagement structure 192 opposite end 168. When spindle assembly 160 is in the fully extended position engagement structure 192 is positioned adjacent spindle engagement member 190. The engagement structure is formed to define one or more guide structures 194 that project outward from the engagement structure. Alternatively, guide structures 194 may be formed as channels in the engagement structure as illustrated in FIG. 17. Exemplary guide structures 194 extend around exemplary engagement structure 192 in a generally helical pattern. The leading edges (as determined by the direction of spindle rotation) of guide structures 194 are angled inward toward housing 84, while the trailing edges are angled outward from the router housing.

Spindle engagement member 190 is configured to move from an unactuated or cocked position spaced apart from engagement structure 192 as shown in FIG. 14, to an actuated position in contact with the side of the engagement structure shown in FIGS. 15 and 16. As the spindle assembly continues to rotate, one of the guide structures 194 will rotate into contact against the spindle engagement member. The rotational energy of the spindle assembly causes the guide structure to ride along the spindle engagement member, thereby pushing the spindle assembly toward router housing 84 as can be seen in the simulated time-lapse illustrations of FIGS. 15 and 16. When the trailing edge of the guide structure rotates past the engagement member, the spindle engagement member moves further toward the spindle assembly to extend over the edge of the engagement structure and lock the spindle assembly in a fully retracted position as shown in FIG. 16. Once spindle engagement member 190 locks into place over the edge of engagement structure 192, spindle assembly 160 will remain in the fully retracted position until the spindle engagement member is moved back away from the engagement structure to release the engagement structure and allow the spindle assembly to move out of the housing to a fully extended position under the urging of spring 186. Alternatively, cartridge 80 may be removed to release the spindle assembly.

The speed with which spindle assembly 160 retracts away from the user will be determined by the rotational speed of the spindle assembly and the pitch of guide structures 194. For example, if the axial length of engagement structure 192 is 1-inch and an individual guide structure travels the axial length over one circumference (i.e., a pitch of 1-inch per revolution), then a spindle assembly having a rotation speed of 20,000-rpm will retract at a speed of approximately 28 ft/sec (i.e., full retraction of 1-inch in approximately 3 msec). Since a retraction speed of 28 ft/sec is substantially faster that the speed at which a hand or other portion of a user's body would ordinarily approach the router bit, injury to the user would be minimized. Alternatively, other guide structure pitches and spindle assembly speeds may be used.

As described above, reaction subsystem 24 engages the spindle assembly and converts at least a portion of the rotational energy or angular momentum of the spindle assembly into a retraction force on the spindle assembly. In other words, the spindle assembly is self-retracting upon engagement of spindle engagement member 190. As described above, the retraction of the spindle assembly also causes shaft 162 to uncouple from the spindle assembly, thereby allowing the spindle assembly and router bit to stop spinning. Typically, the angular momentum of the spindle assembly will be sufficiently high that the spindle assembly will continue to spin for some finite amount of time after the spindle assembly is fully retracted. Alternatively, reaction subsystem 24 may be configured to brake the rotation of the spindle assembly as in the exemplary embodiments described above. Additionally, spindle engagement member 190 may be configured to engage some braking structure (not shown) on the spindle assembly once the spindle engagement member extends over the edge of engagement structure 192.

It will be appreciated that spindle engagement member 190 may be configured in any of a variety of different ways which may vary with the configuration of spindle assembly 160 and engagement structure 192. In the exemplary embodiment depicted in FIGS. 14-16, spindle engagement member 190 is generally cylindrically shaped and slidably disposed in circular bore 196 in cartridge 80. A biasing mechanism, such as compression spring 198, is positioned to urge the spindle engagement member from its unactuated position shown in FIG. 14 to its actuated position shown in FIGS. 15 and 16. The end of spindle engagement member 190 opposite spring 198 is adapted to extend through a hole (not shown) in cartridge 80. Optionally the hole and/or other portions of the cartridge may be sealed against the entry of debris as described above and in the incorporated references.

Exemplary cartridge 80 also includes a restraining mechanism adapted to hold the spindle engagement member in its unactuated position until a dangerous condition is detected. The exemplary restraining mechanism includes a lever 200 pivotally coupled to the cartridge housing. The short end of lever 200 extends into bore 196 to engage spindle engagement member 190. The long end of lever 200 is held by a fusible member 70 anchored to a contact mount 72 such as described above. The contact mount forms part of a firing subsystem that also includes a charge storage device such as capacitor 202. Upon detection of a dangerous condition by the detection subsystem, the control subsystem controls the firing subsystem to discharge capacitor 202 through contact mount 72, thereby melting fusible member 70 and releasing lever 200. The lever is then free to pivot relative to the cartridge, allowing spindle engagement member 190 to move into contact with engagement structure 192, as shown in FIGS. 15 and 16. Upon actuation of spindle engagement member 190, the expended cartridge 80 is replaced with a new cartridge to return router 10 to operation. Various alternative configurations of suitable cartridges and firing subsystems are described in the incorporated references.

In the exemplary embodiments described above and depicted in FIGS. 14-17, reaction subsystem 24 was configured to use at least a portion of the angular momentum or rotational energy of the spindle assembly to generate a retraction force on the spindle assembly. It will be appreciated however, that the reaction subsystem may alternatively be configured to generate a retraction force in other ways. For example, FIGS. 18-21 illustrate another exemplary embodiment in which reaction subsystem 24 is configured to generate a retraction force independent of the energy or movement of the spindle assembly.

As can be seen in FIGS. 18-21, reaction subsystem 24 includes a generally annular cartridge 80 adapted to fit around spindle assembly 160 and to engage router housing 84 generally concentric with the spindle assembly. Retractable bearing assembly 172 includes a collar 204 adapted to hold bearings 176, and having a generally annular recess 206 adapted to receive cartridge 80. Collar 204 is adapted to slide within a central bore 182 of housing 84. During normal operation, bearing assembly 172 is held in its fully extended (i.e., unretracted) position shown in FIG. 18 by one or more springs 208 or other suitable biasing mechanisms. In the exemplary embodiment, springs 208 are disposed in channels 210 formed in housing 84. Retractable bearing assembly 172 includes one or more support members 212 which extend at least partially into channels 210 and are engaged by springs 208 to maintain the bearing assembly under a constant bias toward the fully extended position.

Figure 19:
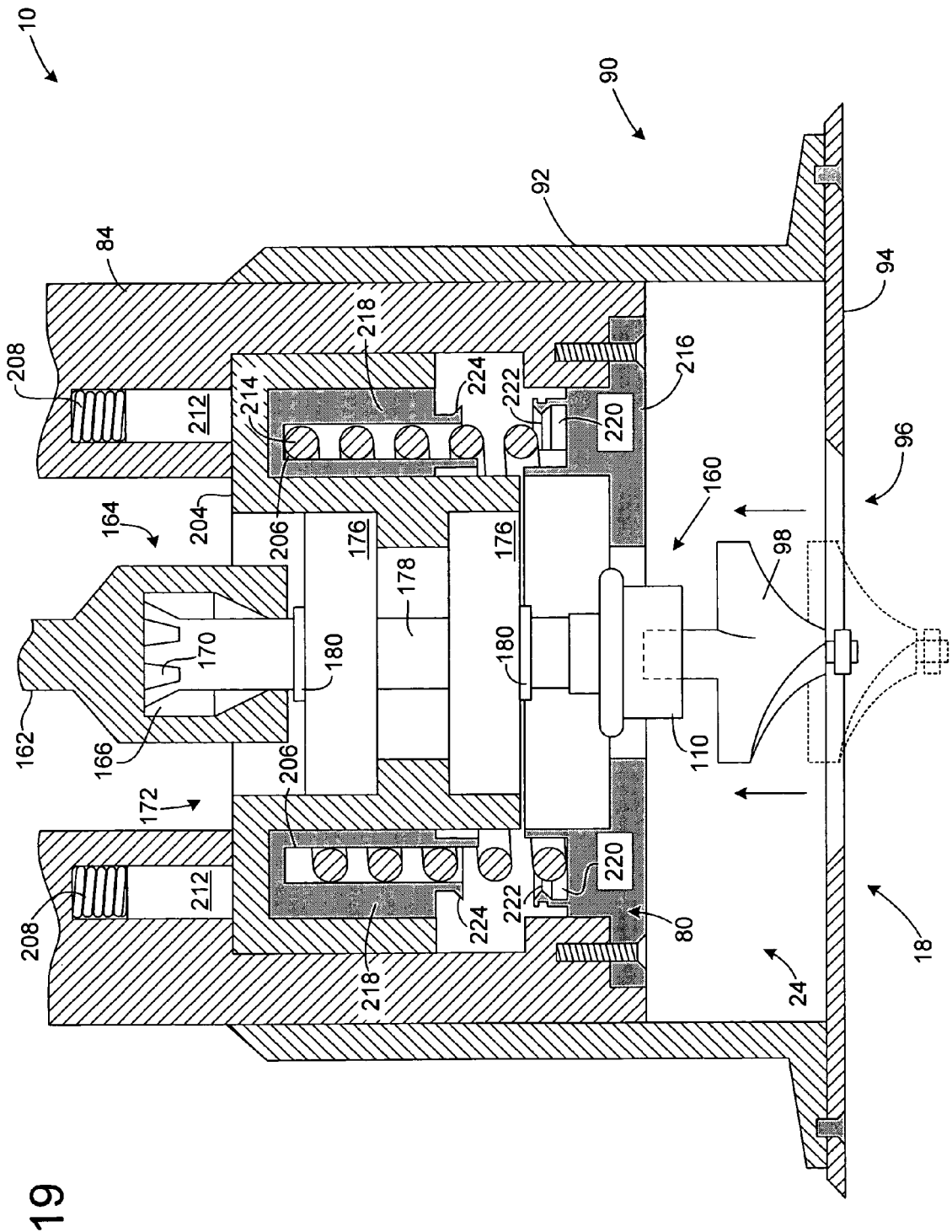
FIG. 19 is a schematic side elevation and partial cross-sectional view of the router of FIG. 18 in which the spindle assembly has fully retracted.

When a retraction force is applied to bearing assembly 172 that is greater than the force applied by springs 208, bearing assembly 172 and spindle assembly 160 will retract at least partially away from the user and into the router housing, as illustrated in FIG. 19. The amount of retraction will vary depending on the relative sizes and configurations of spindle assembly 160, coupling mechanism 164, central bore 182, channels 210, support members 212, etc. In some embodiments, it may be desirable to retract router bit 98 (or at least the cutting edges of the router bit) above support plate 94. In any event, upon removal of the retraction force, bearing assembly 172 and spindle assembly 160 will return to the fully extended position under the urging of springs 208.

Exemplary reaction subsystem 24 generates a retraction force on bearing assembly 172 through a biasing mechanism in cartridge 80. The exemplary biasing mechanism has stored energy which is releasable upon detection of a dangerous condition by the detection system (not shown). It will be appreciated that reaction subsystem 24 may employ various types of stored energy such as mechanical energy, chemical energy (e.g., explosive), pressurized gas, etc. Alternatively, other types of biasing mechanisms may be used.

In the exemplary embodiment, the reaction subsystem stores mechanical energy in the form of a compression spring 214. Cartridge 80 includes a base portion 216 and a releasable portion 218 releasably coupled to the base portion. When coupled together, base portion 216 and releasable portion 218 form an annular cavity adapted to hold spring 214 in compression. During normal operation, base portion 216 and releasable portion 218 are held together by a restraining mechanism in the form of one or more tabs 220 that extend from the base portion to grip the releasable portion. Exemplary tabs 220 include a ridge structure 222 adapted to grip a corresponding recess 224 of releasable portion 218. The ridge structures of tabs 220 are held tightly against recess 224 by a fusible member 70. Tabs 220 are somewhat flexible such that when fusible member 70 is melted, the tabs will flex outward sufficiently to slide out of recess 224, thereby allowing releasable portion 218 to move under the urging of spring 214 as illustrated in FIG. 19. Spring 214 is adapted to exert a force on releasable portion 218 and bearing assembly 172 that is substantially greater than the force exerted by springs 208, thereby causing the bearing assembly and spindle assembly to retract away from the user when the fusible member is melted. Once the fusible member has been melted and the spindle assembly has retracted, the used cartridge may be replaced by a new cartridge to return router 10 to operation. Cartridge 80 may be coupled to housing 84 by any suitable means such as one or more bolts, etc.

Figure 20:
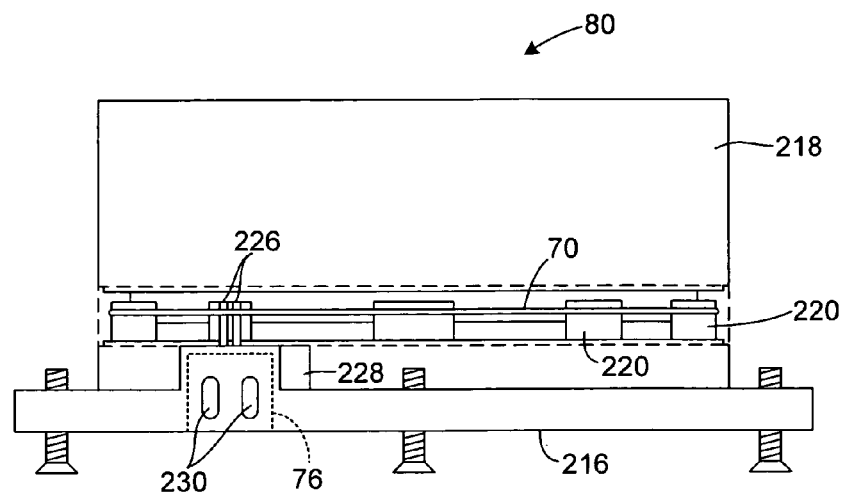
FIG. 20 is a schematic side elevation of the cartridge of FIG. 18.
Figure 21:
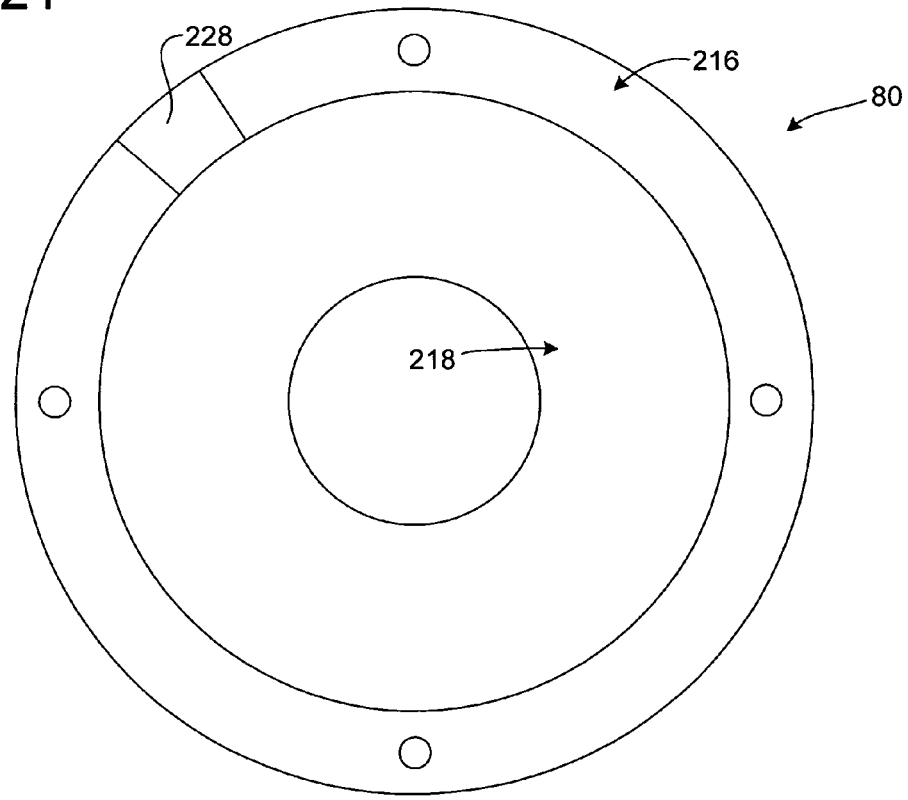
FIG. 21 is a schematic top plan view of the cartridge of FIG. 20.

As best seen in FIG. 20, fusible member 70 is positioned in contact with one or more electrodes 226 connected to a firing subsystem 76 such as described above and in the incorporated references. Upon detection of a dangerous condition by the detection subsystem, firing subsystem 76 supplies a surge of current across electrodes 226 to melt fusible member 70. In the exemplary embodiment, firing subsystem 76 is disposed in a sub-housing 228 formed on or coupled to base portion 216. Sub-housing 228 includes one or more plugs or connectors 230 extending from firing subsystem 76. Sub-housing 228 thus functions similar to an electrical plug and is adapted to fit within a corresponding socket (not shown) in router housing 84. When properly coupled to the router housing, connectors 230 contact corresponding connectors within the router housing to couple firing subsystem 76 to the control subsystem (not shown). Alternatively, one or more additional components of safety system 18 (including the control subsystem) may be mounted in cartridge 80.

It will be appreciated that the speed with which spindle assembly 160 retracts will vary depending on the force exerted by springs 208, the retraction force exerted by reaction subsystem 24, and the mass of spindle assembly 160 and bearing assembly. 172. In some embodiments it may be desirable to select springs 208 and spring 214 to achieve a full retraction in approximately 10-msec or less, and preferably in approximately 5-msec or less. However, other retraction speeds may also be suitable depending on the particular application.

As described herein, safety system 18 provides an improved, active system for preventing or minimizing injuries from woodworking machines such as routers, etc. While several exemplary embodiments of safety system 18 are described above, the particular embodiments that have been described serve to illustrate that many different modifications and alterations are possible within the scope of the invention. It will be appreciated by those of skill in the art that safety system 18 may be adapted for use on a variety of other types of woodworking machines in addition to routers. Several examples of such other machines, as well as further detailed descriptions of alternative safety systems adaptable for use on routers may be found in the references incorporated above, as well as in the following references, the disclosures of which are herein incorporated by reference: PCT Patent Application Ser. No. PCT/US00/26812, filed Sep. 29, 2000; U.S. patent application Ser. No. 09/929,221, filed Aug. 13, 2001; U.S. patent application Ser. No. 09/929,226, filed Aug. 13, 2001, issued as U.S. Pat. No. 6,920,814 on Jul. 26, 2005; U.S. patent application Ser. No. 09/929,227, filed Aug. 13, 2001; U.S. patent application Ser. No. 09/929,234, filed Aug. 13, 2001; U.S. patent application Ser. No. 09/929,235, filed Aug. 13, 2001; U.S. patent application Ser. No. 09/929,236, filed Aug. 13, 2001; U.S. patent application Ser. No. 09/929,237, filed Aug. 13, 2001; U.S. patent application Ser. No. 09/929,238, filed Aug. 13, 2001; U.S. patent application Ser. No. 09/929, 240, filed Aug. 13, 2001; U.S. patent application Ser. No. 09/929,241, filed Aug. 13, 2001; U.S. patent application Ser. No. 09/929,242, filed Aug. 13, 2001; U.S. patent application Ser. No. 09/929,244, filed Aug. 13, 2001, issued as U.S. Pat. No. 6,857,345 on Feb. 22, 2005; U.S. patent application Ser. No. 09/929,425, filed Aug. 13, 2001; U.S. patent application Ser. No. 09/929,426, filed Aug. 13, 2001; U.S. patent application Ser. No. 09/676,190, filed Sep. 29, 2000; U.S. Provisional Patent Application Ser. No. 60/312,141, filed Aug. 13, 2001; U.S. Provisional Patent Application Ser. No. 60/308, 492, filed Jul. 27, 2001; U.S. Provisional Patent Application Ser. No. 60/307,756, filed Jul. 25, 2001; U.S. Provisional Patent Application Ser. No. 60/306,202, filed Jul. 18, 2001; U.S. Provisional Patent Application Ser. No. 60/292,100, filed May 17, 2001; U.S. Provisional Patent Application Ser. No. 60/292,081, filed May 17, 2001; U.S. Provisional Patent Application Ser. No. 60/279,313, filed Mar. 27, 2001; U.S. Provisional Patent Application Ser. No. 60/275,595, filed Mar. 13, 2001; U.S. Provisional Patent Application Ser. No. 60/275,594, filed Mar. 13, 2001; U.S. Provisional Patent Application Ser. No. 60/273,902, filed Mar. 6, 2001; U.S. Provisional Patent Application Ser. No. 60/273,178, filed Mar. 2, 2001; U.S. Provisional Patent Application Ser. No. 60/273,177, filed Mar. 2, 2001; U.S. Provisional Patent Application Ser. No. 60/270,942, filed Feb. 22, 2001; U.S. Provisional Patent Application Ser. No. 60/270,941, filed Feb. 22, 2001; U.S. Provisional Patent Application Ser. No. 60/233, 459, filed Sep. 18, 2000; U.S. Provisional Patent Application Ser. No. 60/225,210, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; U.S. Provisional Patent application Ser. No. 60/182,866, filed Feb. 16, 2000; U.S. Provisional Patent Application Ser. No. 60/157,340, filed Oct. 1, 1999; and U.S. Pat. No. 4,267,914, issued May 19, 1981 to Saar.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A router for cutting workpieces with one or more router bits, the router comprising:
   an operative structure including a rotatable shaft;
   a motor assembly coupled to rotate the shaft; and
   a safety system that includes a detection subsystem configured to detect accidental contact between an operator and a router bit coupled to the operative structure, where the safety system is configured to stop the rotation of the router bit coupled to the operative structure in the event the detection subsystem detects accidental contact between the operator and the router bit.

2. The router of claim 1, where the safety system includes a reaction subsystem configured to stop the rotation of the router bit coupled to the operative structure within 10 milliseconds after the detection subsystem detects accidental contact between the operator and the router bit.

3. A router for cutting workpieces with one or more router bits the router comprising:
   an operative structure including a rotatable shaft;
   a motor assembly coupled to rotate the shaft; and
   a safety system that includes a detection subsystem configured to detect accidental contact between an operator and a router bit coupled to the operative structure, where the safety system is configured to stop the rotation of the router bit coupled to the operative structure in the event the detection subsystem detects accidental contact between the operator and the router bit;
   where the safety system includes a reaction subsystem configured to engage at least a portion of the operative structure to stop the rotation of the router bit coupled to the operative structure.

4. The router of claim 3, where the operative structure includes a releasable coupling assembly configured to receive a router bit and rotationally couple the router bit to the shaft, and where the releasable coupling assembly is configured to rotationally uncouple the router bit from the shaft under predetermined conditions.

5. The router of claim 3, where the operative structure includes a brake engagement structure coupled to rotate with the shaft, and where the reaction subsystem includes one or more braking elements configured to engage and stop the rotation of the brake engagement structure.

6. The router of claim 5, further comprising a housing assembly configured to enclose at least a portion of the motor assembly, and where the brake engagement structure is disposed external to the housing assembly.

7. The router of claim 5, further comprising a housing assembly configured to enclose at least a portion of the motor assembly, and where the brake engagement structure is disposed within the housing assembly.

8. The router of claim 5, where the operative structure includes a releasable coupling assembly configured to rotationally couple the brake engagement structure to the shaft, and where the releasable coupling assembly is configured to rotationally uncouple the brake engagement structure from the shaft under predetermined conditions.

9. The router of claim 8, where the releasable coupling assembly is configured to rotationally uncouple the brake engagement structure from the shaft when a predetermined torque load is applied to the releasable coupling assembly.

10. The router of claim 9, where the releasable coupling assembly is configured to rotationally re-couple the brake engagement structure to the shaft when the torque load applied to the releasable coupling assembly decreases to a predetermined level.

* * * * *